(12) United States Patent
Young

(10) Patent No.: US 7,233,907 B2
(45) Date of Patent: Jun. 19, 2007

(54) PARCEL OR SERVICE DELIVERY WITH PARTIALLY SCHEDULED TIME WINDOWS

(75) Inventor: Jeffrey E. Young, Peachtree City, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 392 days.

(21) Appl. No.: 10/214,626

(22) Filed: Aug. 7, 2002

(65) Prior Publication Data

US 2004/0030604 A1 Feb. 12, 2004

(51) Int. Cl.
*G05B 19/418* (2006.01)
*G06F 9/46* (2006.01)
*G06F 17/00* (2006.01)
*G06F 17/50* (2006.01)
*G07B 17/02* (2006.01)
*G07C 1/10* (2006.01)

(52) U.S. Cl. .......................... 705/8; 700/112; 700/149; 708/112; 395/209

(58) Field of Classification Search .................. 705/26, 705/27, 7–9, 32, 402; 700/112; 708/112; 235/376; 395/209
See application file for complete search history.

(56) References Cited

U.S. PATENT DOCUMENTS

| 5,168,451 A | 12/1992 | Bolger |
| 5,265,006 A | 11/1993 | Asthana et al. |
| 5,313,051 A * | 5/1994 | Brigida et al. .............. 235/375 |
| 5,444,444 A * | 8/1995 | Ross ........................... 340/994 |
| 5,528,489 A | 6/1996 | Asahara et al. |
| 5,541,848 A | 7/1996 | McCormack et al. |
| 5,615,121 A | 3/1997 | Babayev et al. |
| 5,616,899 A | 4/1997 | Recigno |
| 5,648,770 A * | 7/1997 | Ross ........................... 340/994 |
| 5,692,125 A | 11/1997 | Schloss et al. |
| 5,760,742 A * | 6/1998 | Branch et al. .............. 342/457 |

(Continued)

FOREIGN PATENT DOCUMENTS

JP         08106493 A    4/1996

(Continued)

OTHER PUBLICATIONS

White, Ron, How Computers Work, Millennium Ed. Que Corporation, Sep. 1999.*
Derfler, Frank J. et al. How Networks Work, Millennium Ed., Que Corporation, Jan. 2000.*
Gralla, Preston, How the Internet Works, Millennium Ed., Que Corporation, Aug. 1999.*
White, Ron, How Computers Work, 6th Ed., Que Corporation, Sep. 10, 2001.*

(Continued)

*Primary Examiner*—Andrew J. Fischer
*Assistant Examiner*—Nancy T. Le
(74) *Attorney, Agent, or Firm*—Alston & Bird LLP

(57) ABSTRACT

A delivery scheduling system that is configured for scheduling the delivery of an item or service from a sender to an intended recipient. After receiving a signal indicating that, for example, a particular package is to be delivered to an intended recipient, the system attempts to establish interactive contact with the recipient either by direct contact with the recipient, or by leaving the recipient a message to establish direct contact with the system at a convenient time. Upon establishing contact with the recipient, the system allows the intended recipient to schedule delivery of the package. More particularly, the recipient may schedule the package to be delivered: (1) within a particular time window; (2) before or after a particular time of day; or (3) on a particular day.

16 Claims, 20 Drawing Sheets

U.S. PATENT DOCUMENTS

| | | | |
|---|---|---|---|
| 5,774,867 A | 6/1998 | Fitzpatrick et al. | |
| 5,809,479 A | 9/1998 | Martin et al. | |
| 5,831,860 A * | 11/1998 | Foladare et al. | 700/219 |
| 5,848,395 A | 12/1998 | Edgar et al. | |
| 5,893,073 A | 4/1999 | Kasso et al. | |
| 5,920,846 A | 7/1999 | Storch et al. | |
| 5,922,040 A | 7/1999 | Prabhakaran | |
| 5,960,408 A | 9/1999 | Martin et al. | |
| 5,970,466 A | 10/1999 | Detjen et al. | |
| 5,987,377 A * | 11/1999 | Westerlage et al. | 701/204 |
| 6,010,239 A | 1/2000 | Hardgrave et al. | |
| 6,012,037 A | 1/2000 | Yoshikawa | |
| 6,029,140 A | 2/2000 | Martin et al. | |
| 6,035,278 A | 3/2000 | Mansour | |
| 6,047,260 A | 4/2000 | Levinson | |
| 6,064,976 A | 5/2000 | Tolopka | |
| 6,073,110 A | 6/2000 | Rhodes et al. | |
| 6,085,170 A | 7/2000 | Tsukuda | |
| 6,088,648 A | 7/2000 | Shah et al. | |
| 6,101,480 A | 8/2000 | Conmy et al. | |
| 6,167,379 A | 12/2000 | Dean et al. | |
| 6,192,346 B1 | 2/2001 | Green | |
| 6,240,362 B1 | 5/2001 | Gaspard, II | |
| 6,289,323 B1 | 9/2001 | Gordon et al. | |
| 6,394,354 B1 * | 5/2002 | Wilz et al. | 235/472.01 |
| 6,492,912 B1 * | 12/2002 | Jones | 340/994 |
| 6,496,775 B2 * | 12/2002 | McDonald et al. | 701/213 |
| 6,510,383 B1 * | 1/2003 | Jones | 701/209 |
| 6,539,360 B1 * | 3/2003 | Kadaba | 705/28 |
| 6,701,299 B2 | 3/2004 | Kraisser et al. | |
| 6,859,722 B2 * | 2/2005 | Jones | 701/200 |
| 6,859,787 B2 * | 2/2005 | Fisher et al. | 705/26 |
| 6,865,560 B1 * | 3/2005 | Sansone et al. | 705/404 |
| 2002/0007299 A1 | 1/2002 | Florence | |
| 2002/0007326 A1 | 1/2002 | Hashimoto et al. | |
| 2002/0032573 A1 | 3/2002 | Williams et al. | |
| 2002/0032612 A1 | 3/2002 | Williams et al. | |
| 2002/0103766 A1 | 8/2002 | Chi | |
| 2002/0107820 A1 | 8/2002 | Huxter | |
| 2002/0143428 A1 | 10/2002 | Sansone | |
| 2002/0147654 A1 | 10/2002 | Kraisser et al. | |
| 2003/0033181 A1 | 2/2003 | Simon et al. | |
| 2003/0037009 A1 * | 2/2003 | Tobin et al. | 705/65 |
| 2003/0097287 A1 | 5/2003 | Franz et al. | |
| 2003/0158791 A1 | 8/2003 | Gilberto et al. | |
| 2003/0208372 A1 * | 11/2003 | Estes | 705/1 |
| 2003/0236688 A1 | 12/2003 | Kadaba et al. | |
| 2004/0084519 A1 | 5/2004 | Barta et al. | |
| 2005/0038758 A1 * | 2/2005 | Hilbush et al. | 705/402 |

FOREIGN PATENT DOCUMENTS

| | | |
|---|---|---|
| JP | 2000020386 A | 1/2000 |
| WO | WO 0046728 | 8/2000 |
| WO | WO 01/69488 | 9/2001 |

OTHER PUBLICATIONS

Gralla, Preston, How the Internet Works, 6th Ed., Que Corporation, Sep. 7, 2001.*

Muller, Nathan J., Desktop Encyclopedia of the Internet, Artech House, Inc., 1998.*

Press Release: UPS Introduces On-the-Spot Tracking, United Parcel Service Press Release, Atlanta, Georgia, Jun. 14, 1999.*

Press Release: UPS Online Work Link Delivers FREE Internet Access to Web Shipping and Digital Document Delivery Services, United Parcel Service Press Release, Atlanta, Georgia, Oct. 4, 1999.*

Press Release: UPS Advances E-Commerce Strategy with Next-Generation Web Tools, United Parcel Service Press Release, Atlanta, Georgia, Apr. 6, 1999.*

Press Release: RPS Adds Automated Package Pick-Up to Redesigned Web Site, FedEx Corporation, Nov. 11, 1998.*

Bragg, Steven M., Accounting Best Practices, John Wiley and Sons, Inc., 1999.*

U.S. Appl. No. 10/076,029, filed Feb. 12, 2002, Simon et al.

Timothy P. Henderson; "*Scheduling Software Helps Webvan Meet 30-Minute Delivery Window*", Jul. 2000, pp. 1-2; printed from www.stores.org.

The Descartes Systems Group, Inc.; "*Descartes, The Global Leader in E-Fulfillment*", Apr. 2000, pp. 1-2; printed from www.descartes.com.

The Descartes Systems Group, Inc.; "*DeliveryNets, E-Business Solutions to Customer Fulfillment*", pp. 1-4; printed from www.descartes.com, approximately Jan. 2001.

The Descartes Systems Group, Inc.; "e-Frame, A Framework for Building DeliveryNets", p. 1-3; printed from www.descartes.com approximately Jan. 2001.

The Descartes Systems Group, Inc.; "e-Scheduler, Web-Based Self-Scheduling for Delivery", pp. 1-3; printed from www.decartes.com approximately Jan. 2001.

Author Unknown; "*In the Driver's Seat, Mobile Technology Improves Route Delivery Efficiency and Saves Big Bucks for Multi-Marques*", Baking & Snack Magazine, Apr. 1998, pp. 1-2.

A. Breiner; "*Mobile Accounting System Keeps Deliveries Fresh*", Food Logistics, Apr. 15, 1999, p. 1.

The Descartes Systems Group, Inc.; "*E-Fulfillment Solutions*," Mar. 20, 2000, pp. 1-2 and pp. 1-4, printed from www.descartes.com/solutions/dnet.home3.html and www.descartes.com/solutions/catalog.html.

Author Unknown; "*Descartes Releases Customer-Centric Web Scheduling Solution for Home Delivery and Consumer Direct Operations*", Business Wire, Jan. 18, 2000, pp. 1-2, printed from http://quicken.excite.com/investments/news/story/bw/.../a0322.htm &symbol=DSG.

P. Carter; "*Computer Based Truck Dispatch Works Wonders in Hunter Valley*", Australian Mining, Oct. 1990, pp. 42-46, vol. 82 (Australia).

P. Davis; "*Airline Ties Profitability Yield to Management*", SIAM News, May/Jun. 1994, pp. 1-6, vol. 27, No. 5; printed from http://www.siam.org/siamnews/mtc/mtc694.htm.

T. Baron; "*One Vendor, One Solution—Businesses Turn to ERP to Help Simplify Their Supply Chains and Avoid Integration Hassles*", InformationWeek, Nov. 8, 1999, p. 108.

Y. Hamaguchi, et al.; "*Transportation Scheduling System Based on Evolution Algorithm and Super Parallel Computer*", 'Steps Forward': Second World Congress on Intelligent Transport Systems; Nov. 1995, pp. 2027-2030, vol. 4 (Yokohoma, Japan).

Unknown Author, "Crisplant Parcel Mate™," printed from http://www.picktolight.com/solution_finder/prod_serv.asp?ps=P &solID=0&brand-&cati . . . , FKI Logistex—Product Finder at www.fkilogestex.com, printed on Oct. 30, 2002, 2 pages.

Relaystar, "About Us—What is RelayStar," "How does RelayStar work?", 6 pages, www.relaystar.com., printed Nov. 19, 2002.

Kinek Technologies Inc., "Introduction," "Solution Overview," and "Solution Components," 5 pages, www.kinek.com, printed Nov. 19, 2002.

Kiala, "My Parcels, when and where it suits me," 4 pages, www.kiala.com., printed Nov. 19, 2002.

Declaration of Jan McCarthy dated Mar. 23, 2004, 6 total pages, with Appendix.

UPS Pressroom 1999 Press Release—Customers Spend Less Phone Time With New Voice Recognition System;, Mahwah, N.J. May 3, 1999. Yahoo Search 3 pages.

FedEx Home Delivery Has Yet to Truly Arrive; by Penelope Pasturis, Forbes.com, Jun. 29, 2000; two pages.

Service Info—Options for FedEx HomeDelivery; Fedex.com, copyright 1995-2002 FedEx; one page.

FedEx Plans Customizable Delivery for Online Shoppers; dated Jan. 24, 2000; News story by Linda Rosencrance; Computerworld.com; two pages.

* cited by examiner

PARCEL OR SERVICE DELIVERY WITH PARTIALLY SCHEDULED TIME WINDOWS

FIELD OF THE INVENTION

This patent relates generally to delivery scheduling systems, and more particularly to systems for scheduling deliveries to be made within specified time windows.

BACKGROUND OF THE INVENTION

Businesses currently use a variety of different methods for arranging the delivery of items and services to recipients. For example, after receiving an order from a third party, a florist may contact a person to whom flowers are to be delivered and confirm that the person will be at home at a certain time to receive the flowers. Similarly, a repair or installation service may contact a customer after receiving a certain part or product to arrange a time to install the part or product in the customer's home.

In the context of parcel delivery, parcel delivery services, such as UPS, typically receive packages from package senders (i.e., consignors) for delivery to intended package recipients (i.e., consignees). After receiving a particular package, a parcel delivery service will typically use a delivery scheduling system to develop a delivery route and schedule for the package. In developing the route and schedule, the scheduling system will generally implement standard logistics modeling techniques that seek, among other things, to reduce the additional distance within a delivery route that a delivery truck will need to travel to make the delivery.

In developing the delivery route and schedule, prior art systems also consider any time constraints imposed by the sender on the delivery. For example, if the sender has specified that the package must be delivered before 10:00 am on the next business day, the delivery service will schedule the package to be delivered before the 10:00 am deadline on the specified day. Thus, a delivery truck will be scheduled to make the delivery before 10:00 am, even if the delivery truck will need to travel far out of its way to make the delivery on time, and even if the package recipient is scheduled to receive other deliveries in a separate trip later in the day.

Thus, the focus of prior art systems is to assure that the package is delivered in the most cost-effective manner possible while meeting any established delivery deadline. If there is a conflict between meeting a delivery deadline and delivering the package at low-cost, the system will typically sacrifice the low-cost aspect of the delivery and schedule the package to be delivered on time.

However, because the package recipient is often unavailable to receive a package according to the delivery schedule established by the sender, it often turns out that the extra expense of delivering the package according to this schedule is not of particular value to the recipient, the sender, or the delivery service. In fact, in situations where the package delivery service can not leave the package unattended at the place of delivery, attempting to deliver the package according to the schedule specified by the sender may actually delay receipt of the package by the intended recipient. If the recipient is unavailable to receive the delivery on the delivery date established by the sender, the delivery service will typically try again to make the delivery on the following day, which delays the delivery by at least one day. Alternately, the recipient may choose to pick up the package from a delivery service branch office, which may be inconvenient for the recipient, and which may also delay delivery of the package to the recipient.

Failed deliveries are not only undesirable because they may result in untimely receipt of the package by the intended recipient, but also because they result in increased delivery costs for the parcel delivery service. A failed delivery typically makes it necessary to reschedule delivery of the package and to execute at least one additional delivery trip to deliver the package.

Even in situations where the intended recipient is available to receive the package according to the schedule specified by the sender, the intended recipient may actually have no preference about what time they receive the package on a particular day, or whether the package is delivered on the delivery date specified by the sender. For example, a busy accountant may be scheduled to receive a package by 10:00 am on a particular morning, but may not actually be available to review the contents of the package until 5:00 pm that afternoon. In addition, it may be relatively expensive for the delivery service to make the delivery by 10:00 am, but relatively inexpensive for the delivery service to make the delivery by 3:00 pm. In this case, there is no real benefit to delivering the package as part of an expensive "before 10:00 am" delivery rather than a less-expensive "before 3:00 pm" delivery.

Another example may be understood within the context of scheduling deliveries to a business that receives daily deliveries at the same time every day. Using current delivery scheduling systems, if a sender sends a package to the business and specifies that the package is to arrive before the business' regularly scheduled delivery time, the package delivery service will have to make two separate visits to the business on a particular day. In some situations, making an additional visit to the business to satisfy an early delivery deadline for a particular package may be of no value to the recipient of the package. For example, if the recipient does not need the package before the business' regularly scheduled delivery time, delivering the package before the requested delivery deadline may be of no benefit to the recipient or sender and would, therefore, not justify the additional cost associated with making the early delivery.

Accordingly, there is a need for a parcel delivery scheduling system that is configured to schedule deliveries to be made generally according to rules set forth by the consignor, but also according to the availability of the consignee to receive and use the package.

Turning to the field of grocery delivery, some modern grocery delivery services allow customers to schedule groceries to be delivered to their home within a customer-selected time window. To use these systems, customers access a Web page to first select their desired groceries and then to select an available delivery time window (generally on the following day) in which the groceries are to be delivered. The time windows are generally one-half hour or one hour long.

Algorithms for deciding which time windows are available for presentation to a customer ordering groceries vary from simply allowing a maximum number of deliveries per time window in each route area, to the cost-based time window evaluation method described in UPS pending patent application Ser. No. 09/811,375, filed Mar. 16, 2001, entitled "Variable Time Window Processing Systems and Methods", published Oct. 10, 2002, Publication No. 2002/0147654, now U.S. Pat. No. 6,701,299, which is incorporated herein by reference. The latter method utilizes the durable Roadnet 5000 routing and scheduling program to assess the cost of delivery to a particular address in each possible time window in light of the previous delivery commitments in that route area, and does not present any time window in which the cost would be above a pre-determined threshold. UPS' publicly-available e-Roadnet product is used to interface the Roadnet 5000 program with a Web-based customer ordering interface.

Most home grocery delivery schemes have failed because they were unprofitable. The low volume of orders and unwillingness of customers to pay enough for the delivery service hurt these efforts. One difference in parcel delivery is that many parcel delivery companies (such as UPS) operate thousands of routes each day that are supported financially by the delivery volume of regular customers who have daily pickups and deliveries, although these routes include the burden of sporadic non-daily deliveries.

There is another fundamental difference between parcel delivery and home delivery of groceries. In home grocery delivery, the purchaser places the order and receives the delivery, and therefore can schedule the delivery when making the order. In parcel delivery, the purchaser of the parcel delivery service typically is a consignor who will not be the person receiving the delivery. This leads to a requirement to contact the consignee separately if there is a need to schedule delivery. Therefore, the techniques of home grocery delivery cannot be applied directly to parcel delivery services.

Accordingly, there is a need for a scheduling system that is configured to schedule services (such as the delivery of a package) to be provided generally according to rules set forth by the sender of the service (such as a consignor), but also according to the availability of the intended recipient (such as a consignee) to receive and use the service.

SUMMARY OF THE INVENTION

The present invention provides a scheduling system that is configured to schedule services (such as the delivery of a package) to be provided generally according to rules set forth by the sender of the service (such as a consignor), and also according to the availability of the intended recipient (such as a consignee) to receive and use the service.

More particularly, a preferred embodiment of the invention comprises a delivery scheduling system that is configured for: (1) receiving a signal indicating that a particular item or service is to be delivered to an intended recipient; (2) receiving recipient information comprising information regarding the intended recipient; (3) using the recipient information to initiate communication with the intended recipient; and (4) after performing Step (3), allowing the intended recipient to schedule the delivery within a particular time window. The scheduling system is also preferably further configured for automatically identifying contact information for the intended recipient.

In a preferred embodiment of the invention, relating to package delivery, the system uses the recipient information (such as the intended recipient's name) to access contact information for the recipient (such as the intended recipient's phone number, e-mail address, web address, or pager number) from a database. The system then uses this contact information to initiate communication with the intended recipient. The system preferably uses the contact information to initiate communication with the intended recipient substantially automatically in response to identifying the contact information.

In a further preferred embodiment of the invention, the signal indicating that a particular package is to be delivered to an intended recipient is generated in response to a request by a sender that the package be delivered to the intended recipient. In this embodiment of the invention, the sender and the intended recipient are preferably different entities.

The system is preferably further configured for performing the steps of: (1) identifying one or more time windows in which a delivery service would be willing to deliver the package to the intended recipient on a particular day; (2) allowing the intended recipient to select a particular one of the time windows; and (3) in response to the intended recipient selecting the particular one of the time windows, scheduling the package to be delivered within the particular one of the time windows on the particular day. The step of identifying one or more time windows, referenced above, preferably comprises identifying one or more time windows that are selected to allow a user, such as the intended recipient, to schedule a delivery to occur between a first regularly-scheduled stop and a second regularly-scheduled stop.

In a preferred embodiment of the invention, the communication initiated by the system with the intended recipient comprises communication between the intended recipient and a carrier of the package (e.g., a delivery service). In this embodiment of the invention, the system preferably initiates the communication by sending the intended recipient an electronic message, which, in one embodiment of the invention, includes a link to a web site. This web site is preferably configured to allow the intended recipient to schedule a time for the package to be delivered. The electronic message may also include a phone number that, for example, may be selected to allow the intended recipient to establish communication with a delivery service.

In one embodiment of the invention, the electronic message includes a phone number that is selected to allow the intended recipient to establish communication with an automated phone system. This automated phone system is preferably configured to allow the intended recipient to access information regarding the package. Furthermore, the automated phone system is preferably configured to allow the intended recipient to schedule the delivery. This is preferably done by allowing the intended recipient to select a time window in which the delivery is to be made. The automated phone system is further preferably configured to allow the intended recipient to select a particular date on which the package is to be delivered.

A delivery scheduling system according to a further preferred embodiment of the invention is configured for: (1) scanning destination information from a surface of the package; (2) automatically using the destination information to identify contact information for the intended recipient; and (3) in response to identifying the contact information, automatically using the contact information to initiate communication with the intended recipient.

A delivery scheduling system according to a further preferred embodiment of the invention is configured for: (1) receiving a signal indicating that a particular package is to be delivered to an intended recipient; (2) receiving recipient information that comprises information regarding the intended recipient; (3) using the recipient information to automatically identify contact information for the intended recipient; and (4) using the contact information to initiate the transmission of a message to the intended recipient indicating that a package is scheduled to be delivered to the intended recipient and that the intended recipient has the option of scheduling the delivery of the package to the intended recipient. The message transmitted to the intended recipient preferably comprises contact information for a delivery service.

A delivery scheduling system according to a further preferred embodiment of the invention is configured for: (1) receiving a signal indicating that a sender wishes to send a particular package to an intended recipient via a parcel delivery service, the sender and the intended recipient being different entities; (2) identifying a delivery date on which the package is scheduled to be delivered to the intended recipient; (3) determining whether to offer to deliver the package to the intended recipient within one or more time windows on the delivery date; and (4) in response to determining to offer to deliver the package to the intended recipient within the one or more time windows on the delivery date, allowing the intended recipient to schedule the delivery of the package to the intended recipient.

A delivery scheduling system according to a further preferred embodiment of the invention is configured for: (1) receiving, from a sender, a delivery request that a package be delivered to an intended recipient; (2) determining whether to allow the intended recipient to schedule the package to be delivered within one or more time windows; and (3) in response to determining to allow the intended recipient to schedule the package to be delivered within one or more time windows, automatically initiating the transmission of a message to the intended recipient indicating that the intended recipient may schedule the delivery of the package to the intended recipient. The sender and intended recipient are preferably different entities.

A delivery scheduling system according to a further preferred embodiment of the invention is configured for: (1) receiving, from a sender, a delivery request that a package be delivered to an intended recipient, the sender and the intended recipient being different entities; and (2) in response to receiving the delivery request, automatically initiating the transmission of a message to the intended recipient indicating that a package will be delivered to the recipient and that the recipient may have an option to schedule a delivery of the package to the intended recipient. In a preferred embodiment of the invention, the message includes contact information that the intended recipient may use to contact a parcel delivery service to determine whether the recipient has the option to schedule a delivery of the package to the intended recipient. The message preferably includes contact information that the intended recipient may use to contact a parcel delivery service to schedule the delivery.

A further preferred embodiment of the invention comprises a method of scheduling a delivery of an item to an intended recipient that comprises the steps of: (1) receiving an item to be sent to the intended recipient; (2) scanning the item to retrieve recipient information; (3) determining whether to allow the intended recipient to schedule the delivery to be made within one or more time windows; (4) in response to determining to allow the intended recipient to schedule the delivery to be made within one or more time windows, using the recipient information to contact the intended recipient; and (5) allowing the intended recipient to schedule the delivery to be made within a particular time window. In a preferred embodiment of the invention, the steps of scanning the item and determining whether to allow the intended recipient to schedule the delivery are performed substantially automatically. Furthermore, the steps of using the recipient information to contact the recipient and allowing the intended recipient to schedule the delivery are also performed substantially automatically.

A further embodiment of the invention comprises a method of scheduling a delivery of a package to a recipient that comprises the steps of: (1) receiving, on a first day, a "deliver package" request from a sender that a delivery service deliver a package to an intended recipient on a second day; and (2) automatically initiating contact with the intended recipient to determine whether the recipient would like to schedule the package to be delivered to the intended recipient on a third day, the third day being a day other than the second day. In this embodiment of the invention, the second day is preferably the calendar day immediately following the first day. This method further comprises the steps of: (3) receiving a "reschedule delivery" request from the customer to reschedule the package to be delivered on the third day; and (4) in response to receiving the "reschedule delivery" request from the customer, rescheduling the package to be delivered on the third day.

Yet another embodiment of the invention comprises a method of scheduling a delivery of a package to an intended recipient that comprises the steps of: (1) receiving a request from a sender that a particular package be delivered to the intended recipient before a first deadline on a particular day; (2) in response to receiving the request from the sender, automatically initiating contact with the intended recipient to determine whether the intended recipient would like to reschedule the delivery to be made before a second deadline on the particular day; (3) offering to allow the intended recipient to reschedule the delivery to be made before a second deadline on the particular day; (4) receiving a request from the intended recipient that the delivery be made before a second deadline on the particular day; and (5) in response to receiving the request from the intended recipient, scheduling the package to be delivered before the second deadline on the particular day. The second deadline may either be chronologically earlier or later than the first deadline.

One embodiment of the inventive method discussed immediately above further comprises the step of determining whether a cost associated with delivering the package to the intended recipient before the first deadline is greater than a cost associated with delivering the package to the intended recipient before the second deadline. In this embodiment of the invention, the step of automatically initiating contact with the intended recipient is executed in response to determining that the cost associated with delivering the package to the intended recipient before the first deadline is greater than the cost associated with delivering the package to the intended recipient before the second deadline.

A delivery scheduling system according to a further preferred embodiment of the invention is configured for: (1) receiving a signal indicating that a particular package is to be delivered to an intended recipient; (2) automatically identifying contact information for the intended recipient; (3) transmitting a message to the intended recipient indicating that the intended recipient may attempt to schedule a delivery of the package if the intended recipient initiates contact with a delivery service before a pre-determined deadline; (4) in response to the intended recipient initiating contact with the delivery service before the pre-determined deadline, allowing the intended recipient to schedule the delivery of the package; and (5) in response to the intended recipient not initiating contact with the delivery service before the pre-determined deadline, scheduling the package to be delivered according to a schedule this is not determined by the intended recipient.

In this embodiment of the invention, the pre-determined deadline is preferably established based on a cutoff time for finalizing the route of a delivery vehicle that is scheduled to deliver the package to the intended recipient. In one embodiment of the invention, the step of transmitting a message to the intended recipient is executed in response to making a determination to allow the intended recipient to schedule the delivery of the package. This determination is preferably based at least in part on the cost of making the delivery of the package to the intended recipient according to a predetermined schedule.

Yet another embodiment of the invention comprises a method of scheduling a delivery to an irregular stop to be made as part of a delivery route that comprises a plurality of regularly-scheduled stops. This method comprises the steps of: (1) receiving a request from a consignor that a delivery of an item be made to a consignee at a particular location, the particular location not being a regularly-scheduled stop; (2) initiating communication with the consignee; and (3) offering to allow the consignee to schedule the delivery to be made within at least one time window. The time window is preferably selected to optimize the delivery route. In a preferred embodiment of the invention, the route comprises a series of scheduled stops and a predetermined path extending between the stops, and the time window is selected to minimize any diversion from the predetermined path required to make the delivery. Furthermore, the time window is preferably selected to minimize the time required to complete the delivery route.

An additional embodiment of the invention comprises a scheduling system that is configured for: (A) receiving a signal indicating that a particular service is to be provided to an intended recipient; (B) receiving recipient information comprising information regarding said intended recipient; (C) using said recipient information to initiate communication with said intended recipient; and (D) after performing said Step (C), allowing said intended recipient to schedule said service to be provided within a particular time window.

A further embodiment of the invention comprises a scheduling system that is configured for: (A) receiving a signal indicating that a sender wishes to arrange for a service to be provided to an intended recipient, the sender and the intended recipient being different entities; (B) identifying a delivery date on which the service is scheduled to be provided to the intended recipient; (C) determining whether to offer to provide the service to the intended recipient within one or more time windows on the delivery date; and (D) in response to determining to offer to provide the service to the intended recipient within the one or more time windows on the delivery date, allowing the intended recipient to schedule the provision of the service to the intended recipient.

Yet another embodiment of the invention comprises a scheduling system that is configured for: (A) receiving, from a sender, a request that a service be delivered to an intended recipient, the sender and the intended recipient being different entities; and (B) in response to receiving the delivery request, automatically initiating the transmission of a message to the intended recipient indicating that a service will be provided to the intended recipient and that the intended recipient may have an option to schedule the provision of the service to the intended recipient.

The invention described above is expressed in terms of systems and methods that are configured for executing, or that include, various steps. However, it will be understood by one skilled in the art that the invention also includes systems that are configured to perform, and computer-readable media that include computer-executable instructions for executing, the steps included within the above-described methods. Similarly, one skilled in the art will understand that the invention also includes methods that include, and computer-readable media that include computer-executable instructions for executing, the steps executed by the above-described systems.

BRIEF DESCRIPTION OF THE DRAWINGS

Figure 1:
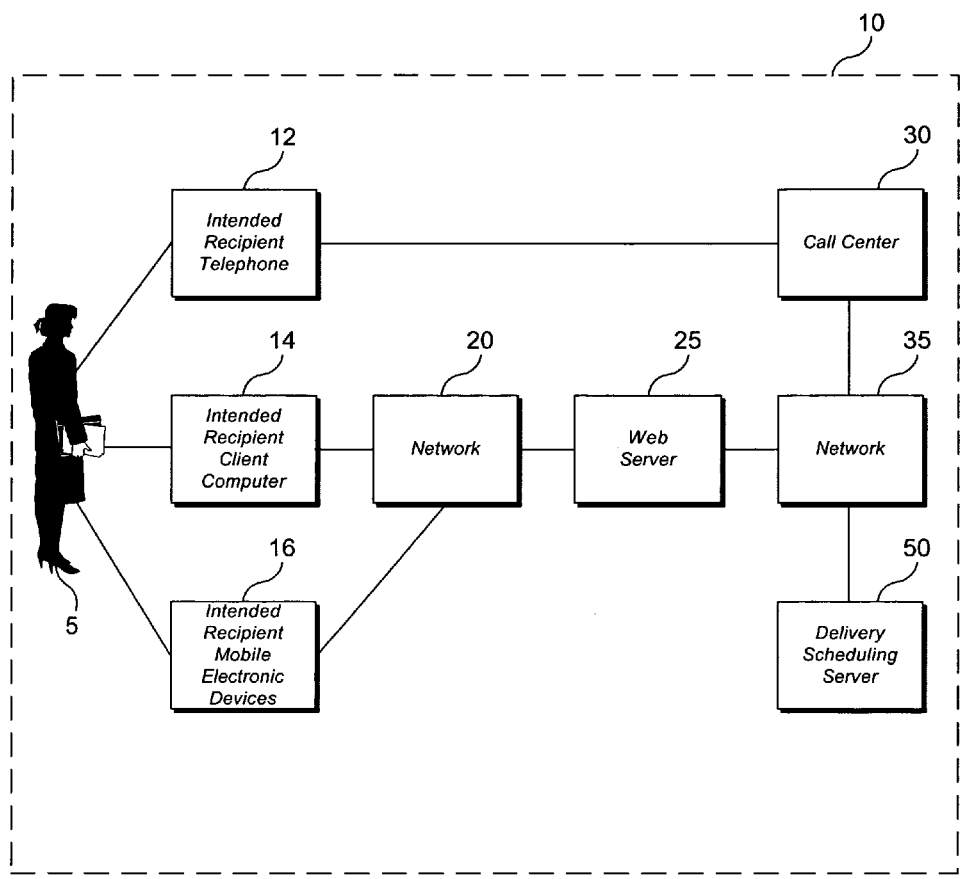

Having thus described the invention in general terms, reference will now be made to the accompanying drawings, which are not necessarily drawn to scale, and wherein:

FIG. 1 is a first block diagram of a system according to one embodiment of the present invention.

Figure 2:
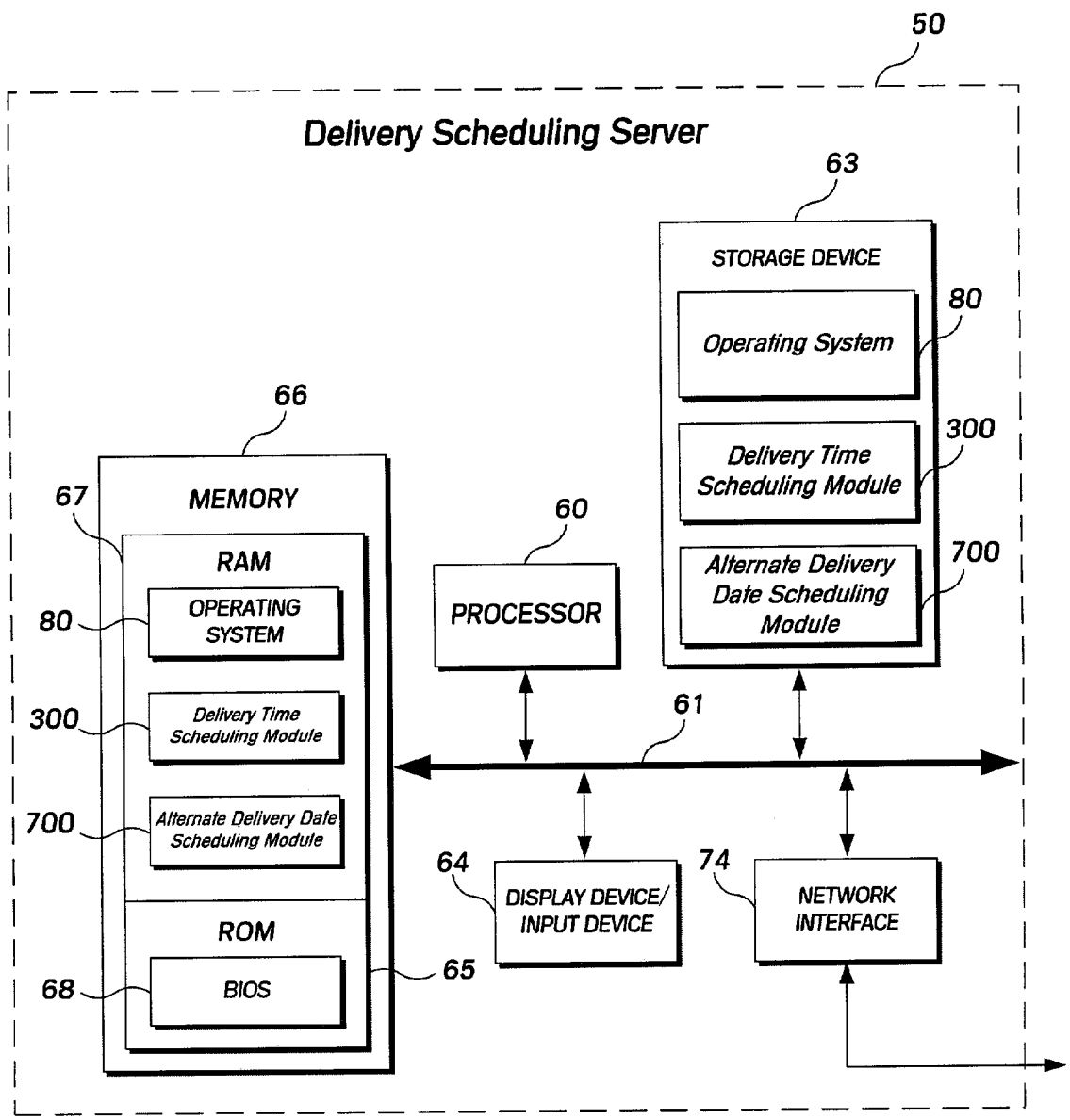
Figure 3A:
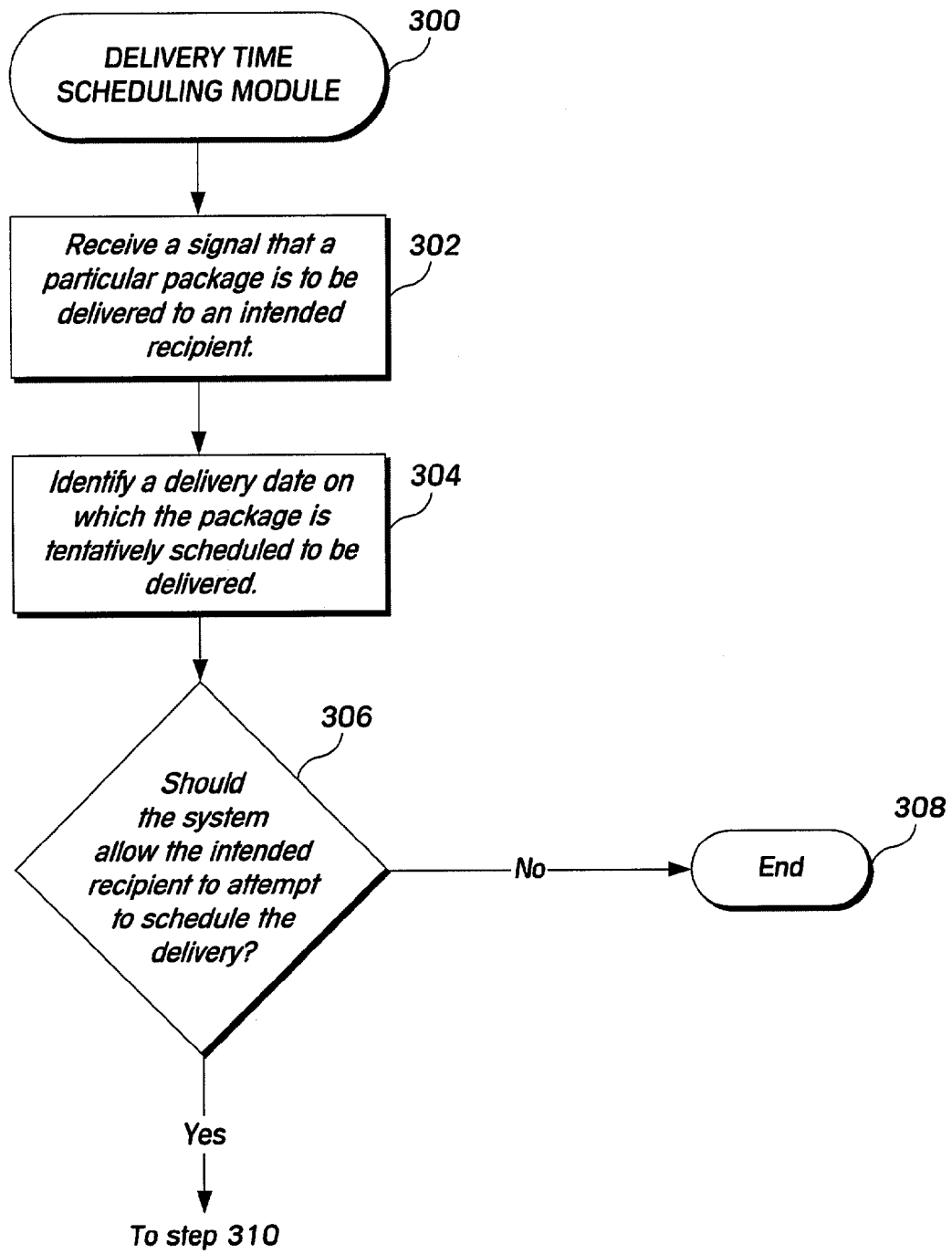
Figure 3B:
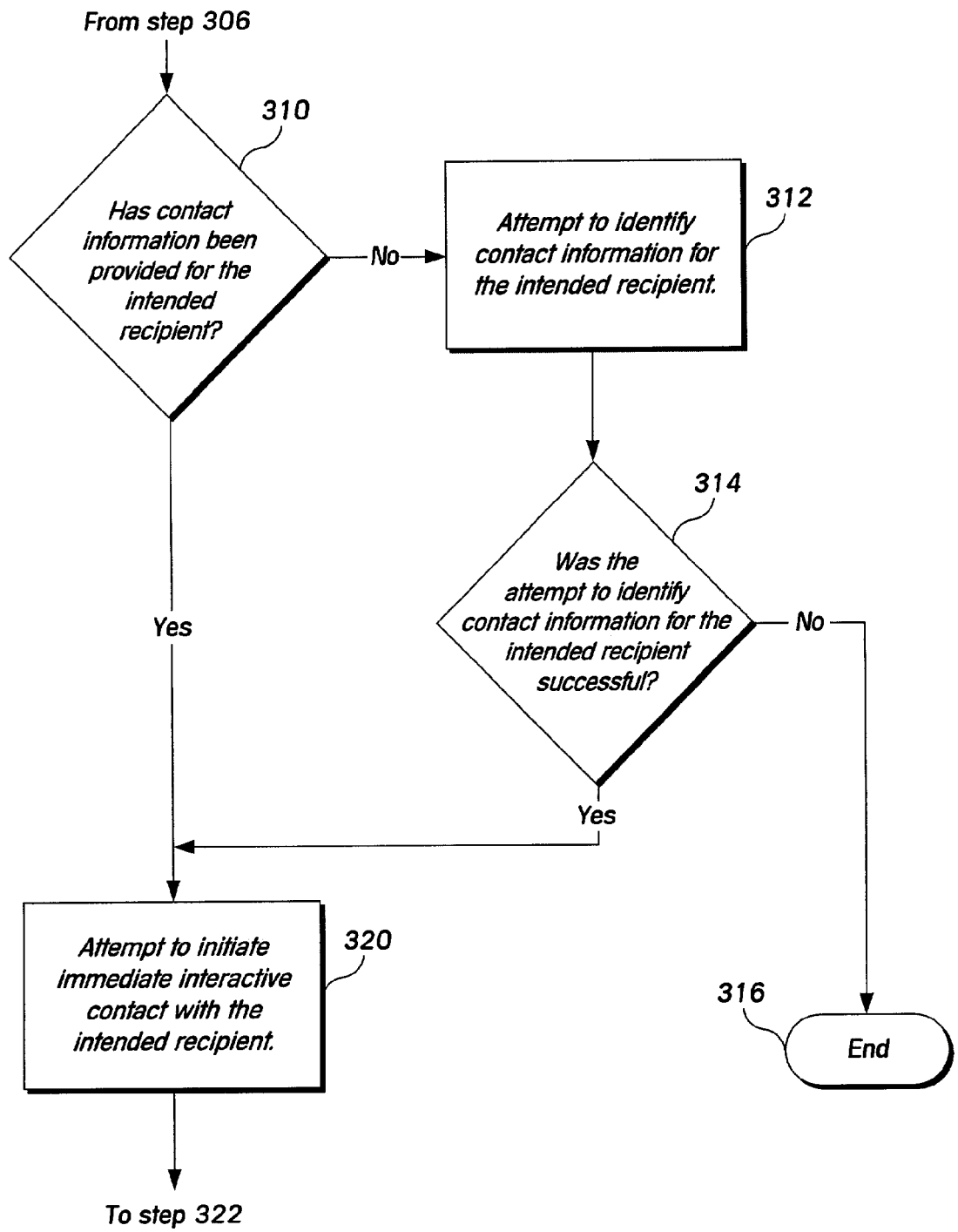
Figure 3C:
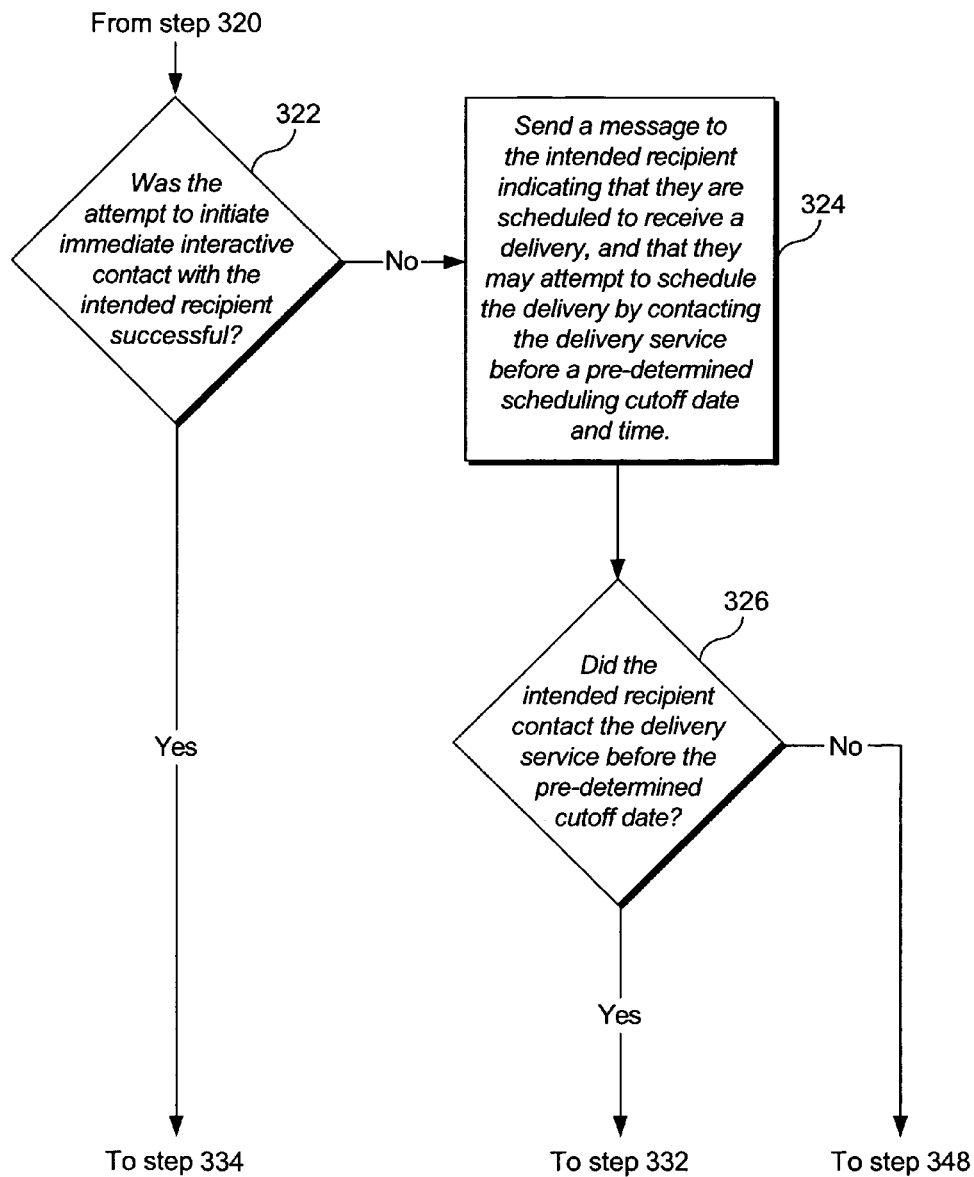
Figure 3D:
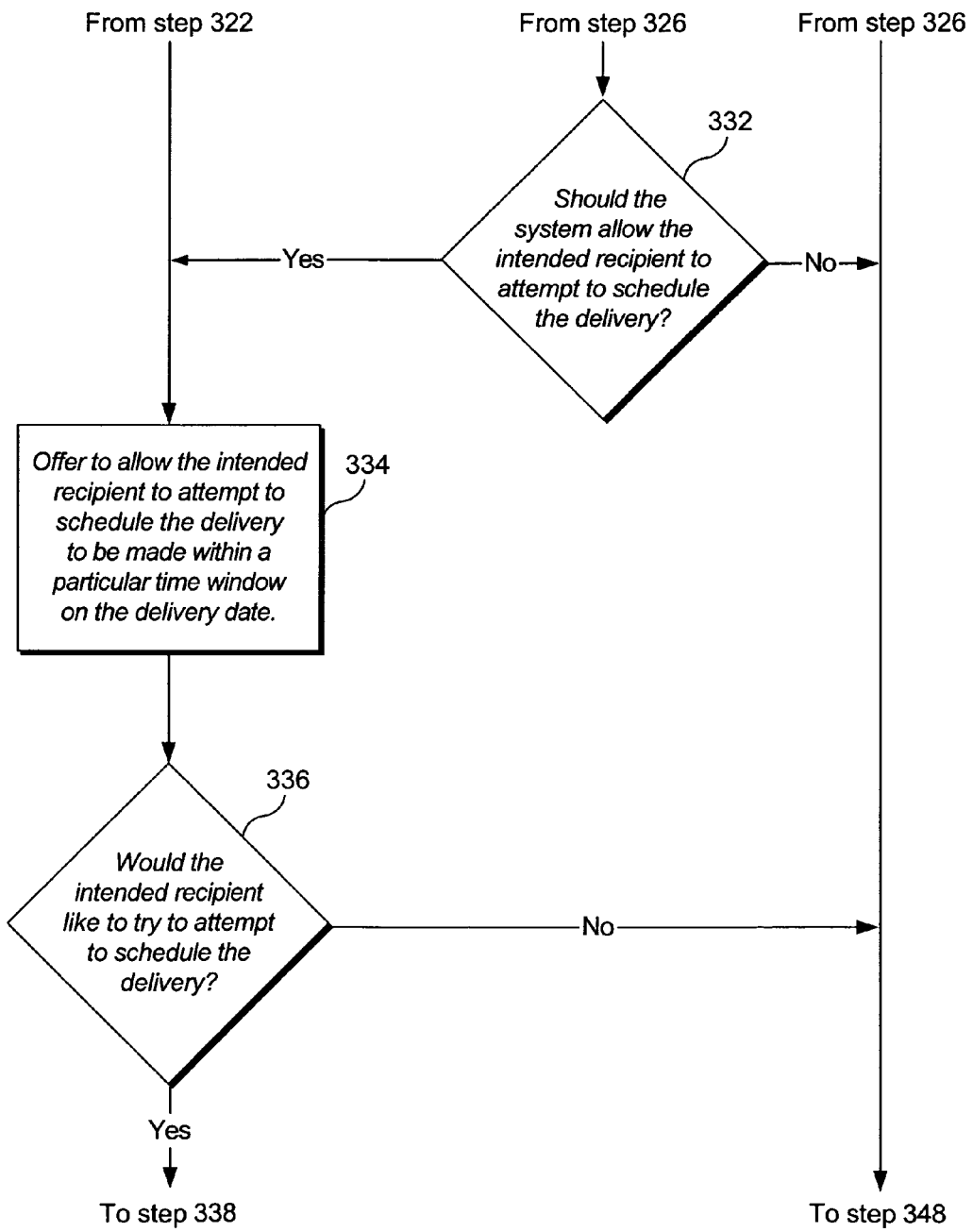
Figure 3E:
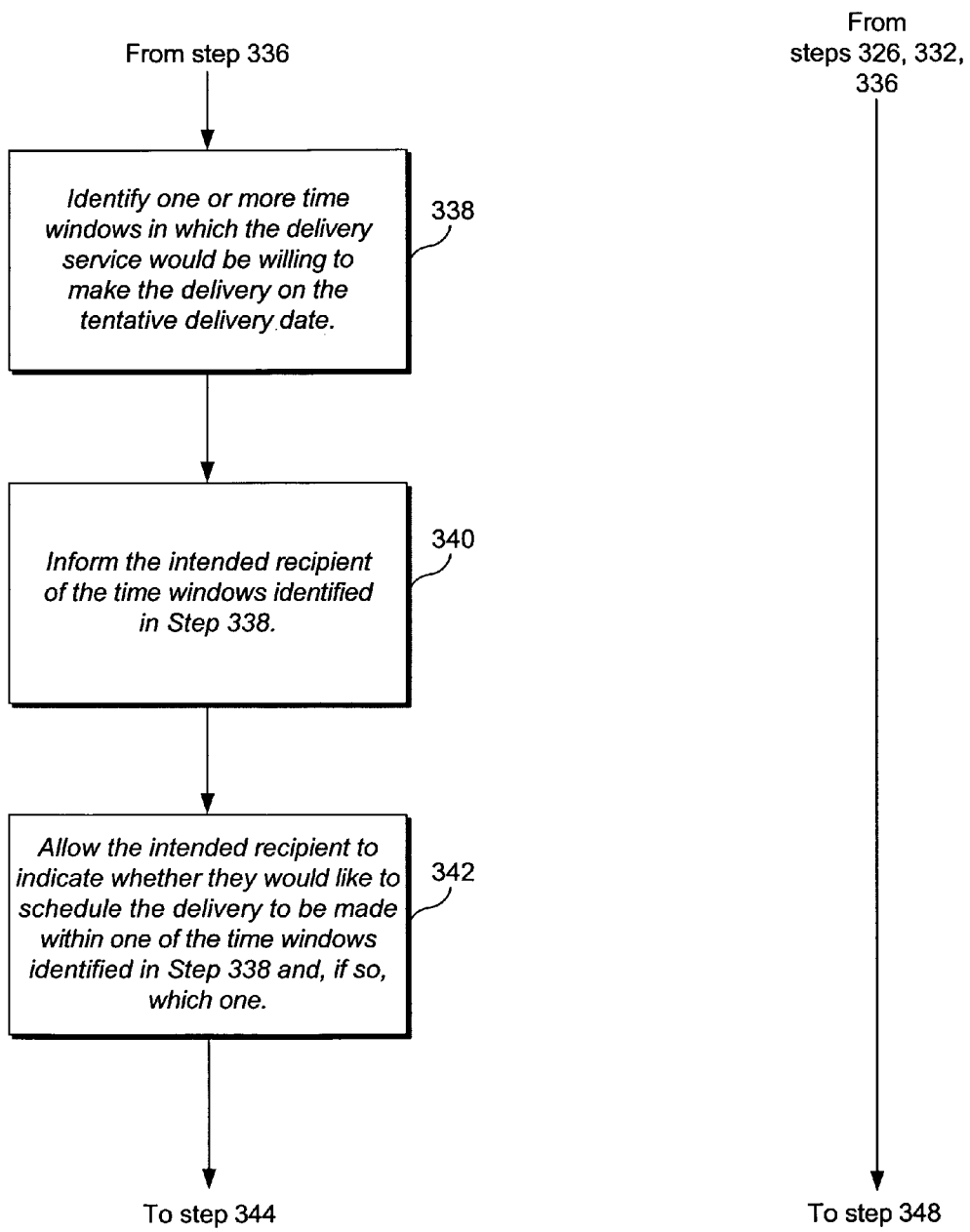
Figure 3F:
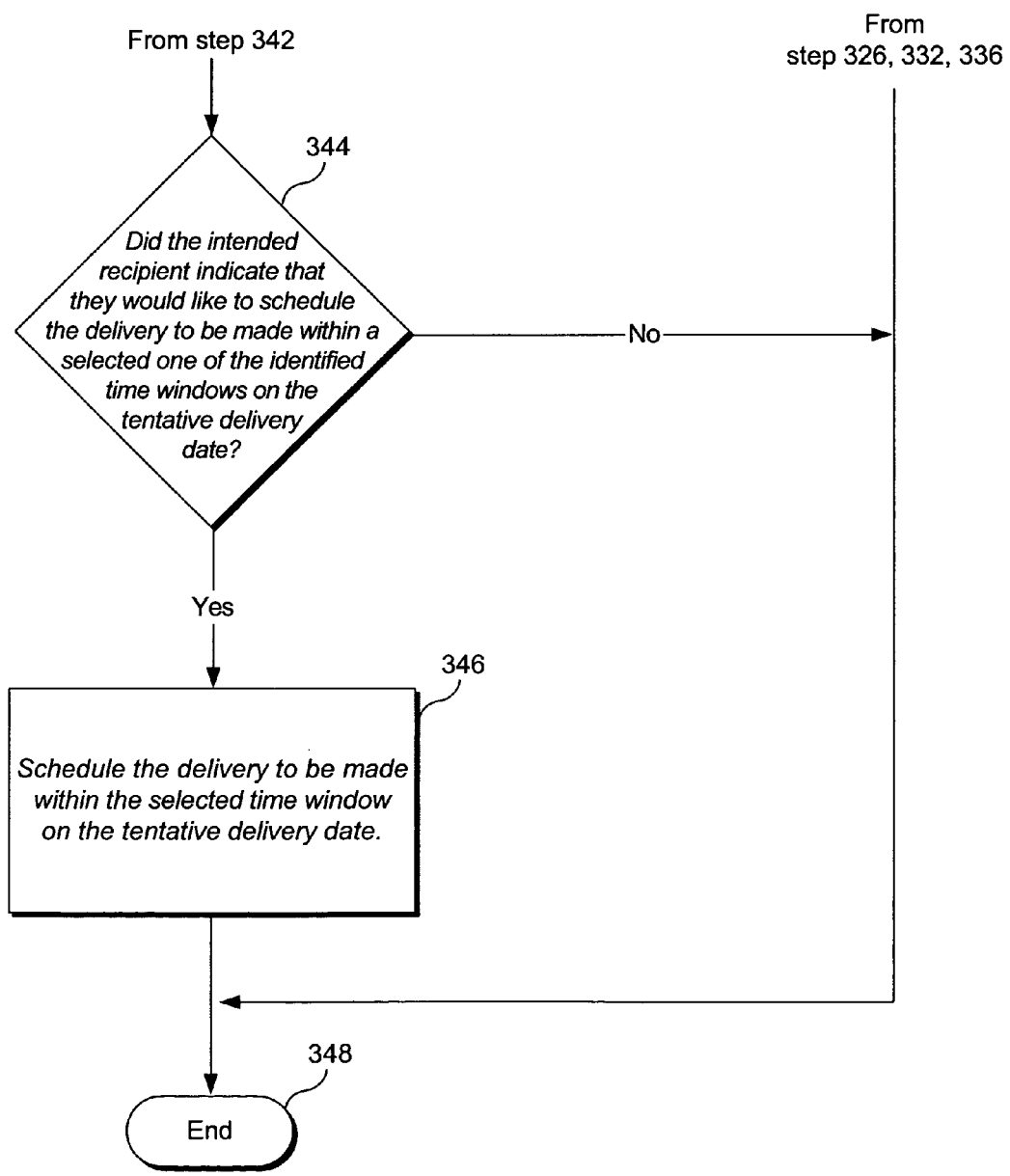

FIG. 2 is a block diagram of a Delivery Scheduling Server according to another embodiment of the invention.

FIGS. 3A-3F depict a flow chart that generally illustrates a Delivery Time Scheduling Module according to another embodiment of the current invention.

Figure 4:
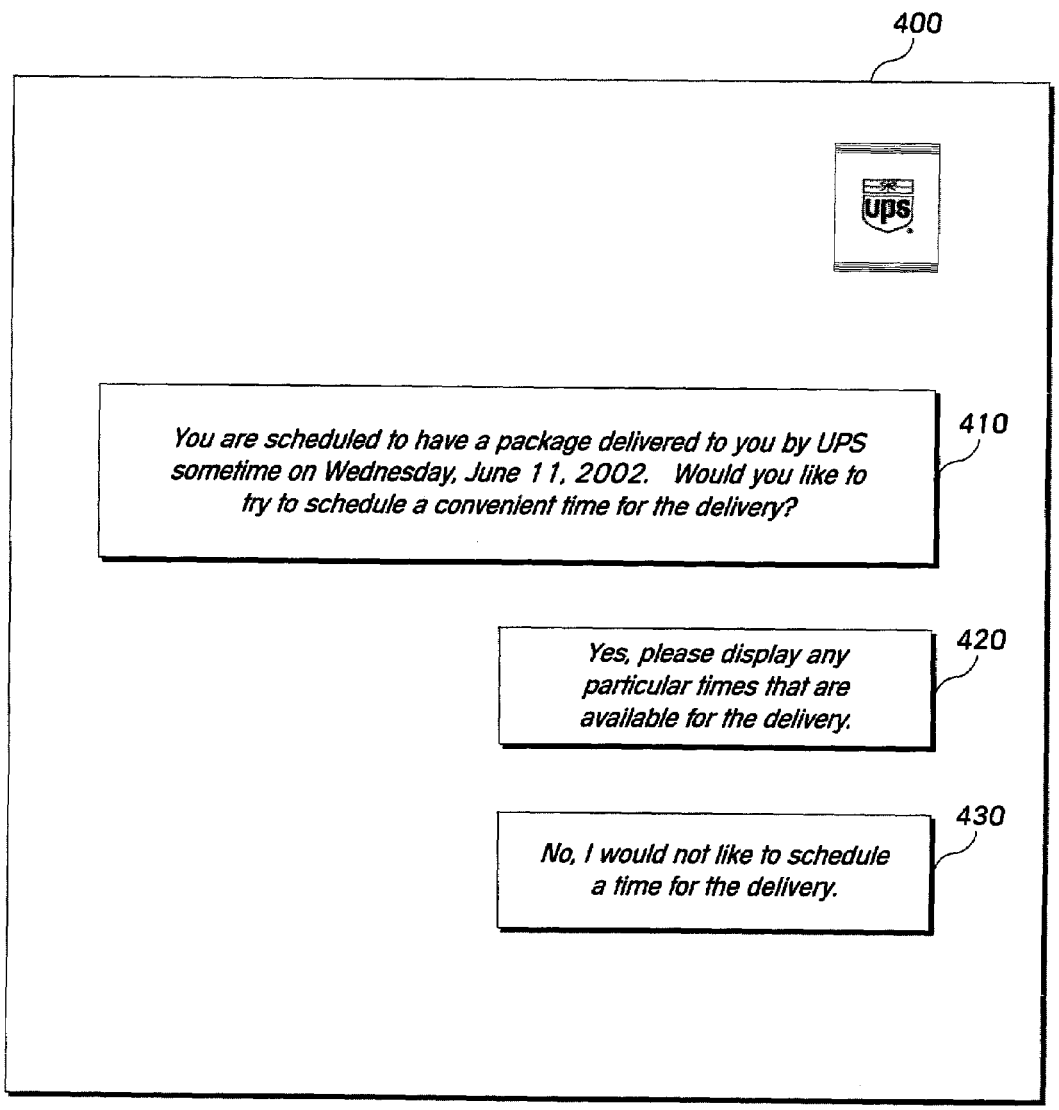

FIG. 4 is a graphic illustration of a "Schedule Delivery-Inquiry" window according to another embodiment of the current invention.

Figure 5:
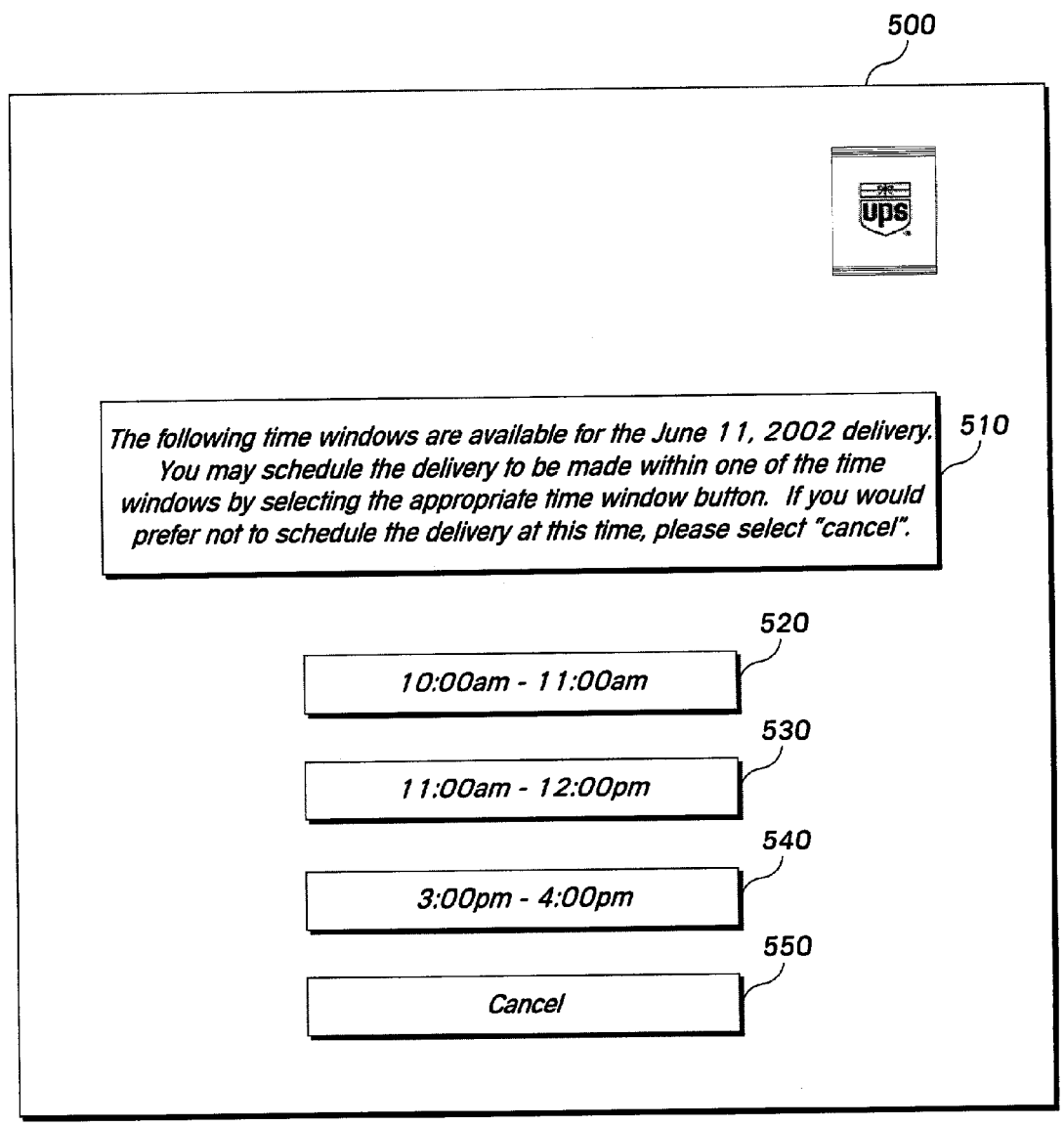

FIG. 5 is a graphic illustration of a "Schedule Delivery" window according to another embodiment of the current invention.

Figure 6:
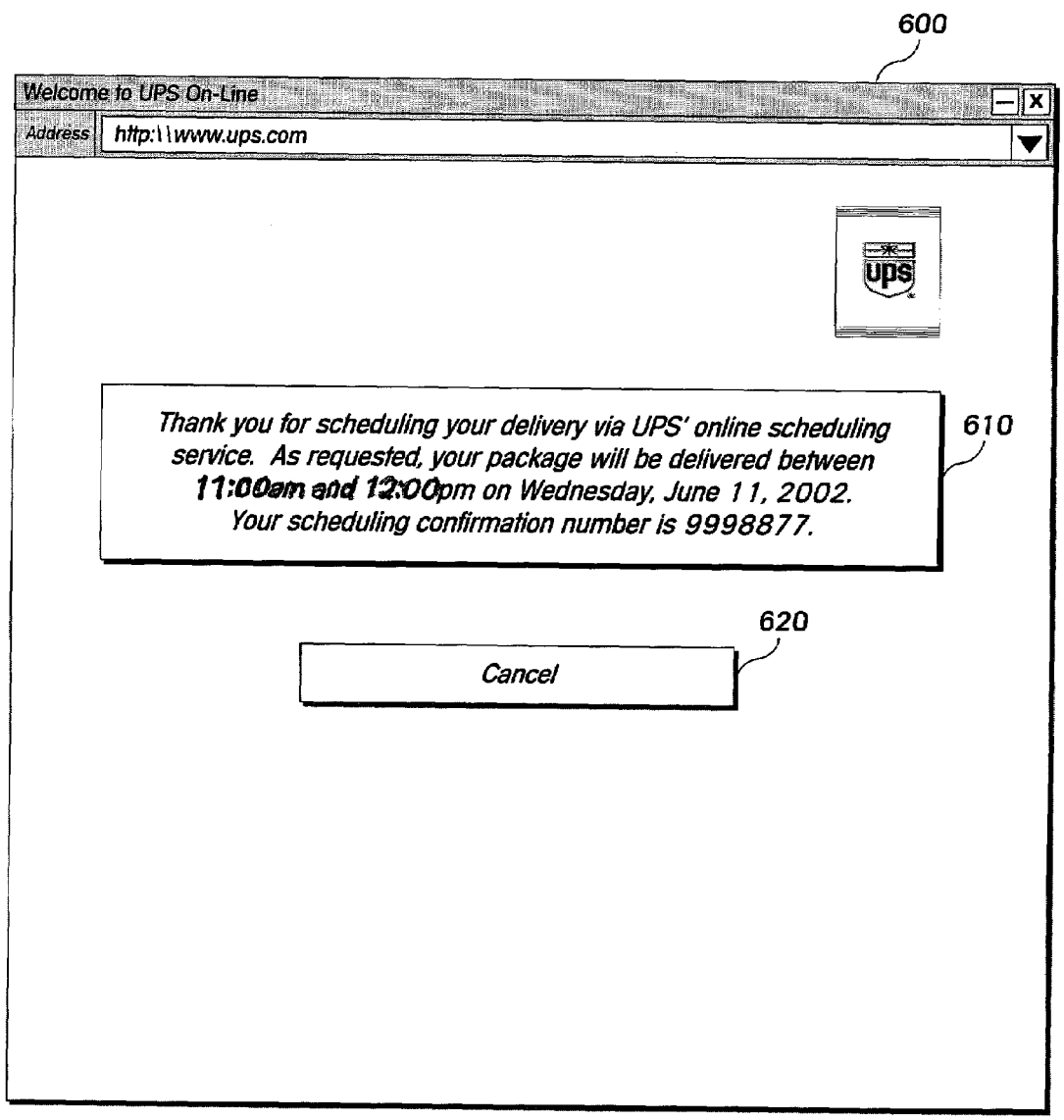
Figure 7A:
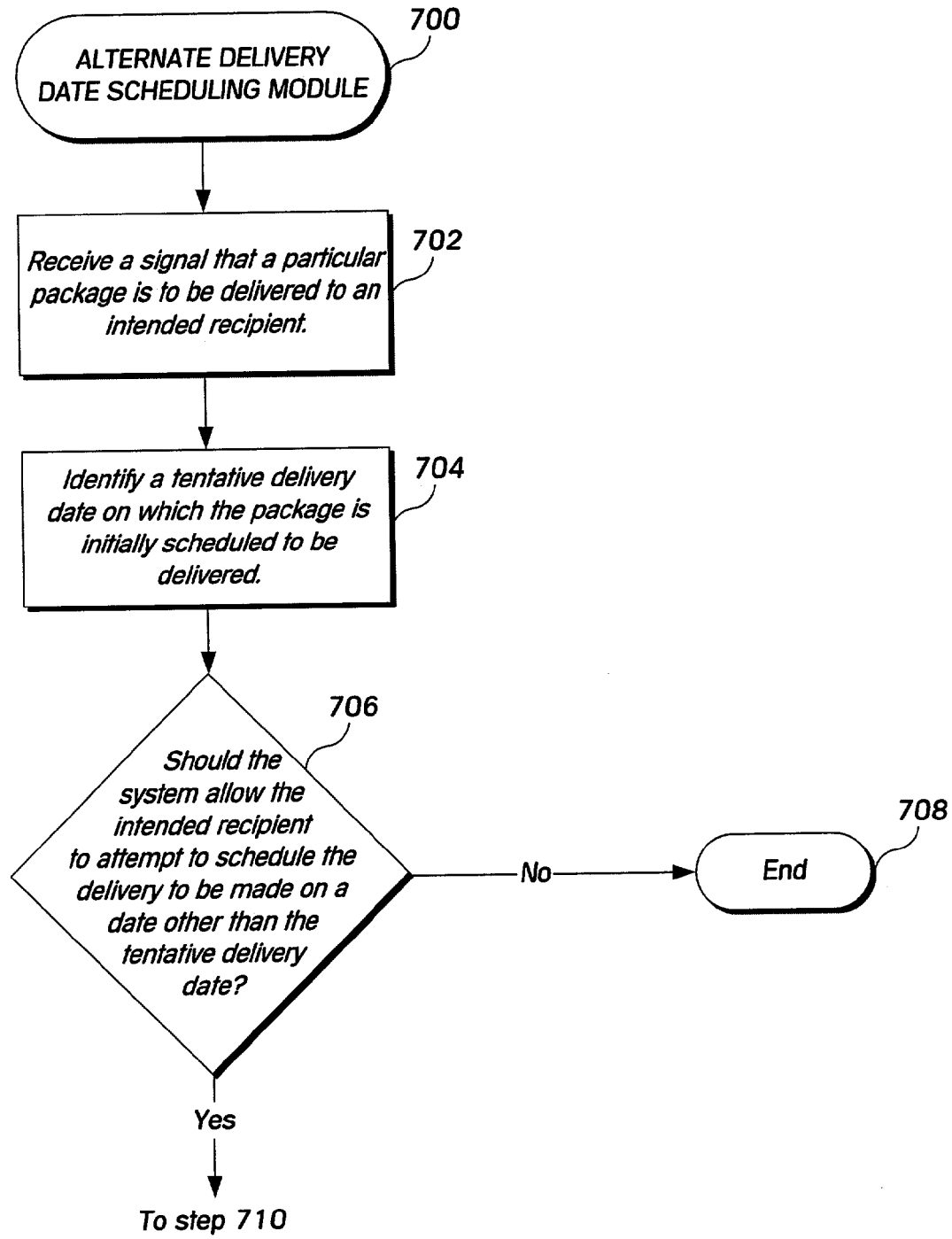
Figure 7B:
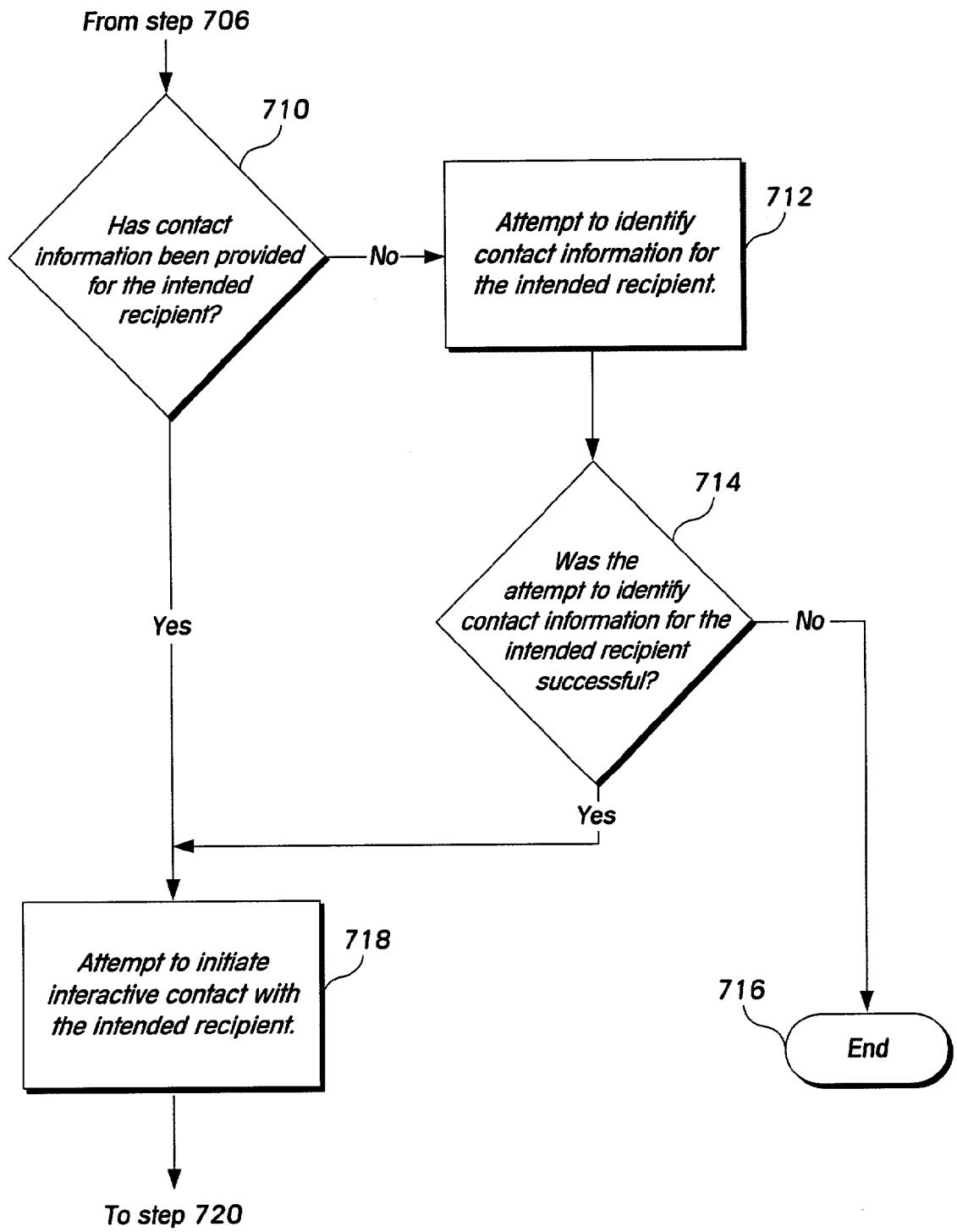
Figure 7C:
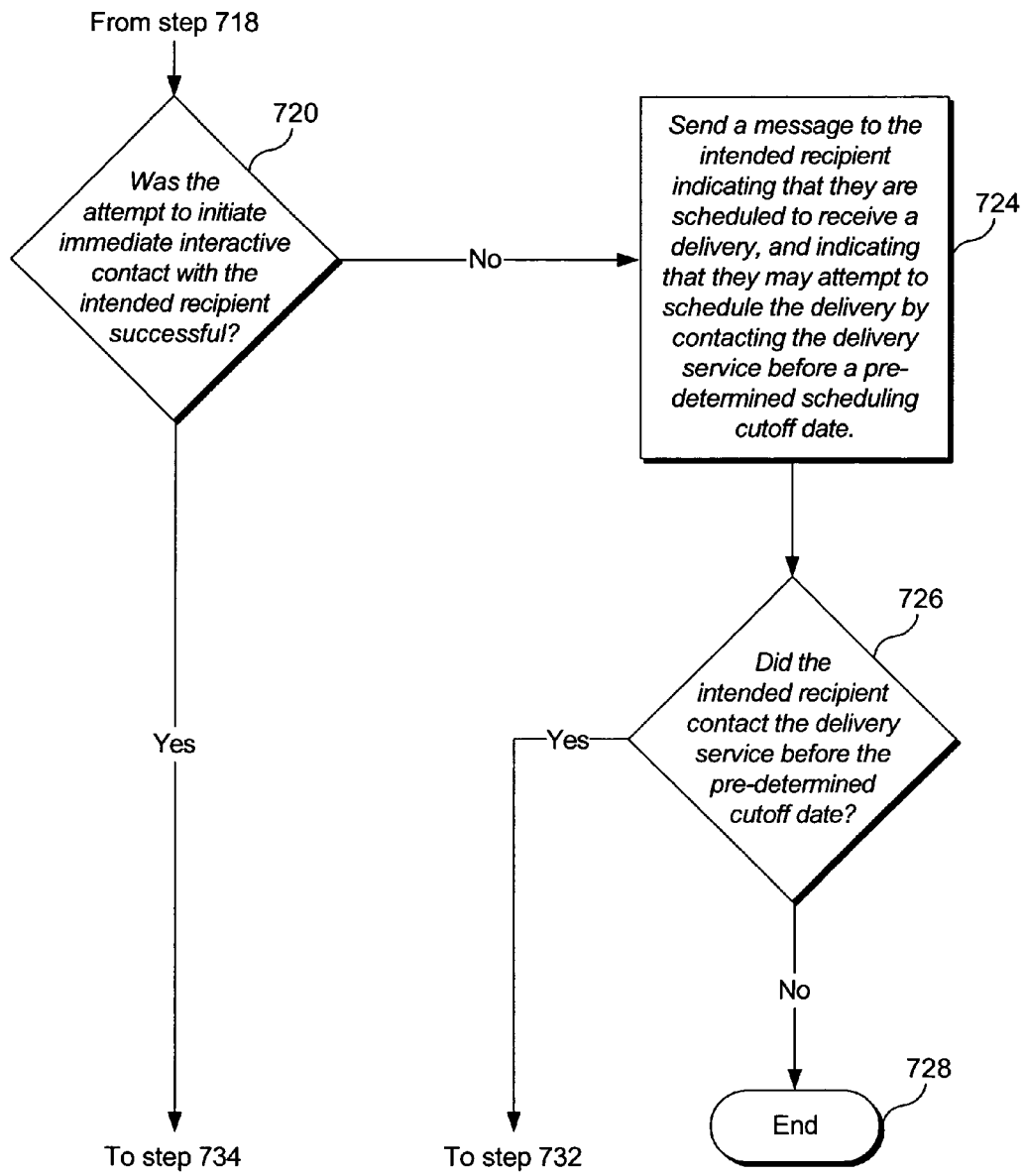
Figure 7D:
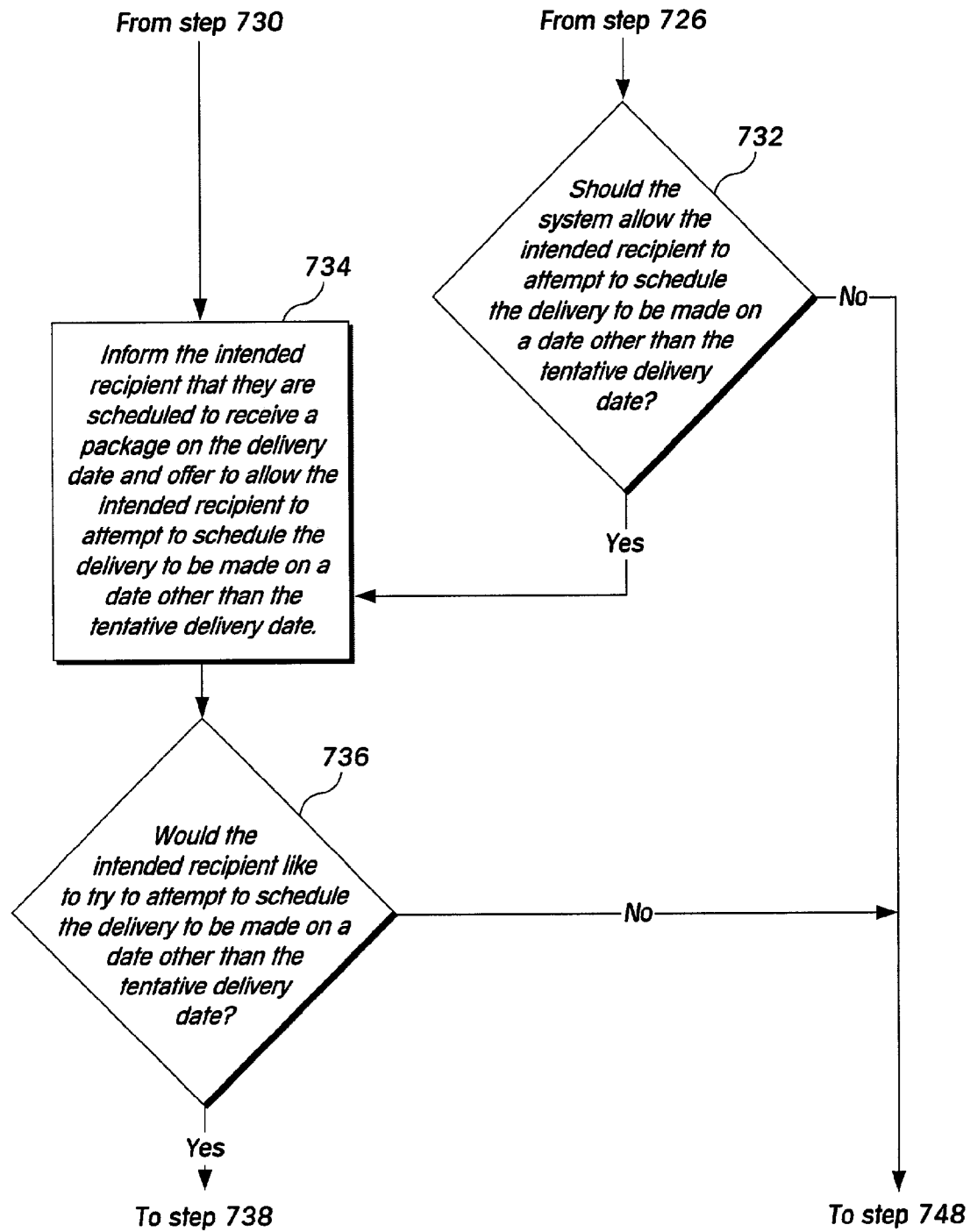
Figure 7E:
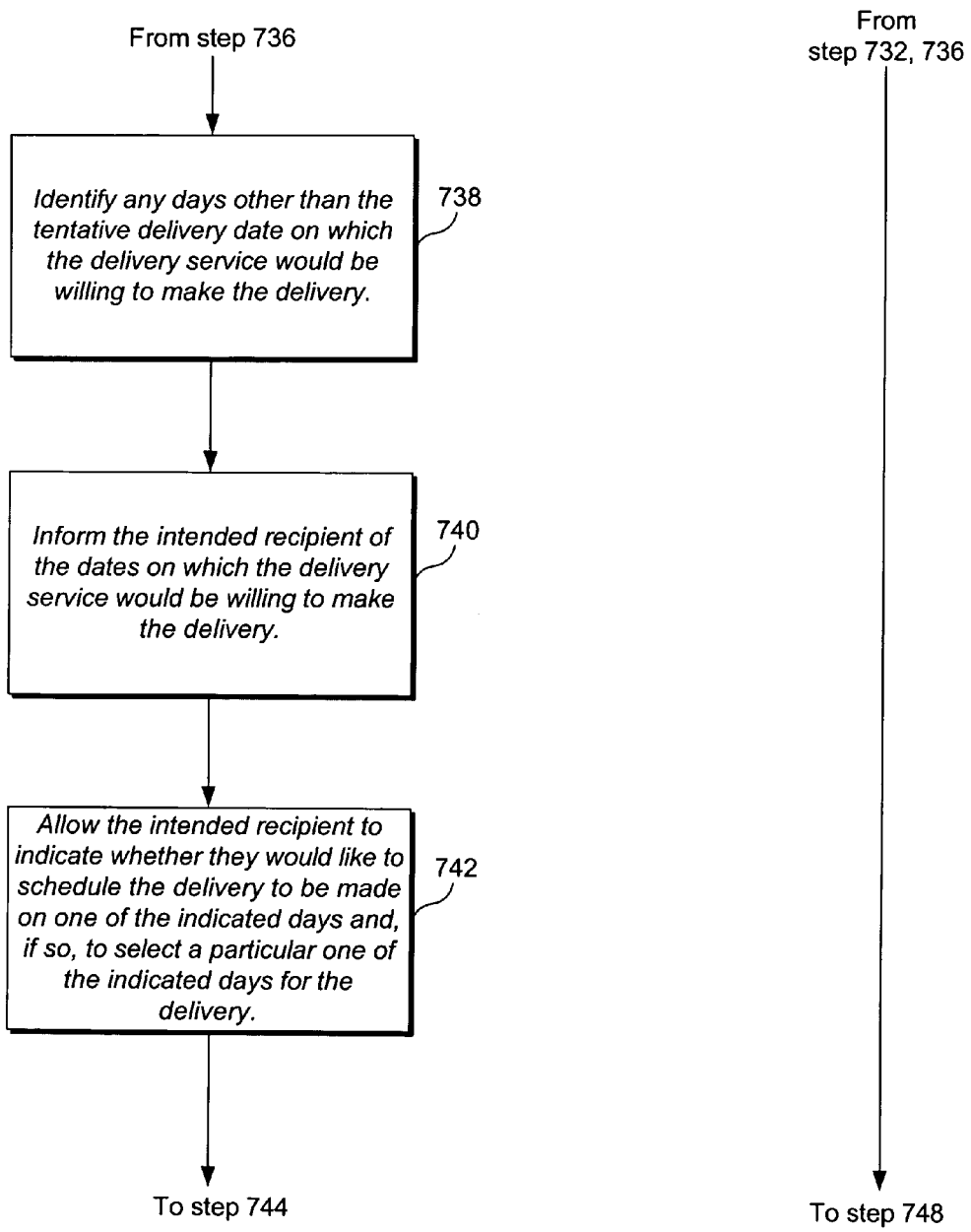
Figure 7F:
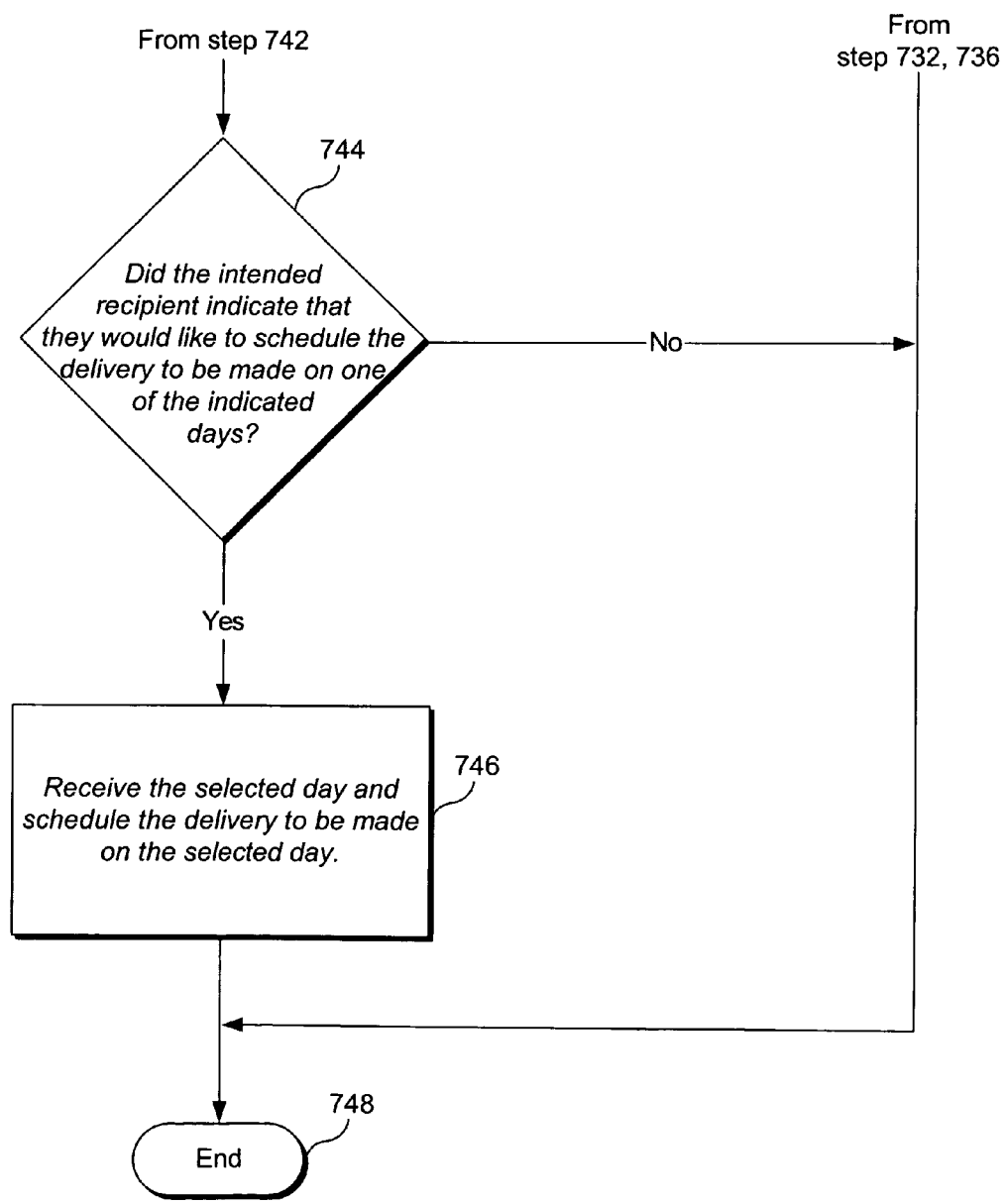

FIG. 6 is a graphic illustration of a "Schedule Delivery-Confirmation" window according to another embodiment of the current invention.

FIGS. 7A-7F depict a flowchart that generally illustrates an Alternate Delivery Date Scheduling Module according to another embodiment of the current invention.

Figure 8:
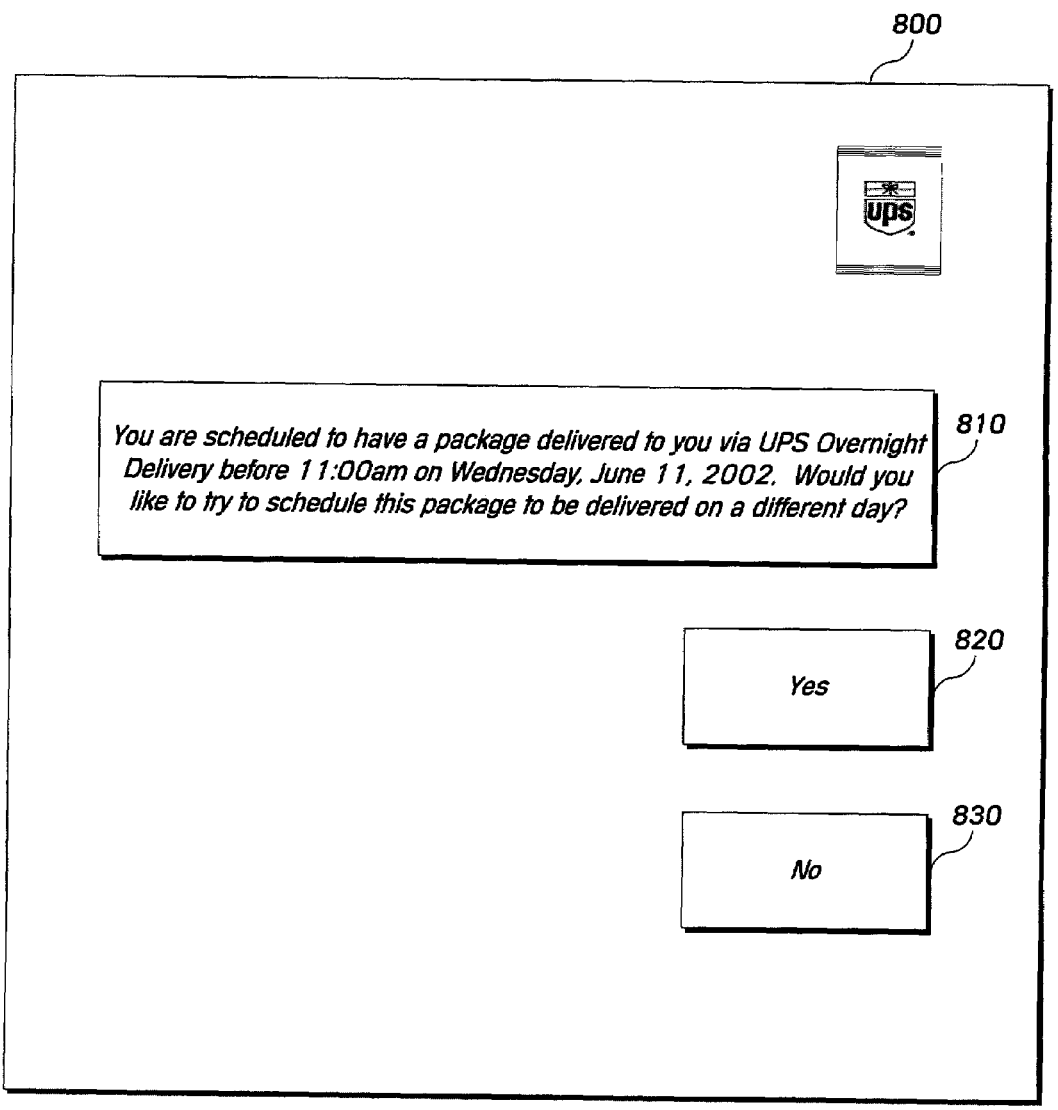

FIG. 8 is a graphic illustration of a "Reschedule Delivery Date-Inquiry" window according to another embodiment of the current invention.

Figure 9:
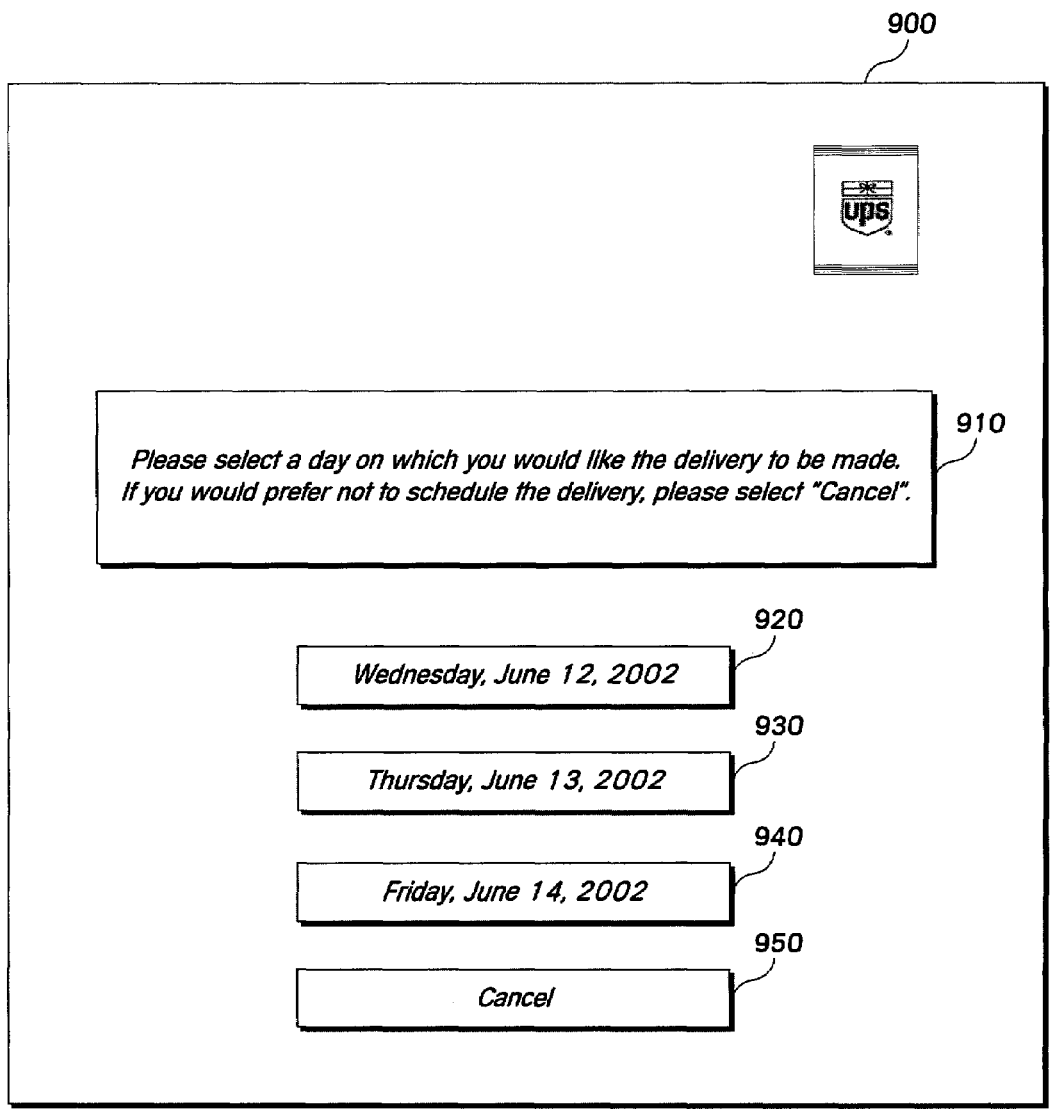

FIG. 9 is a graphic illustration of a "Reschedule Delivery Date" window according to another embodiment of the current invention.

Figure 10:
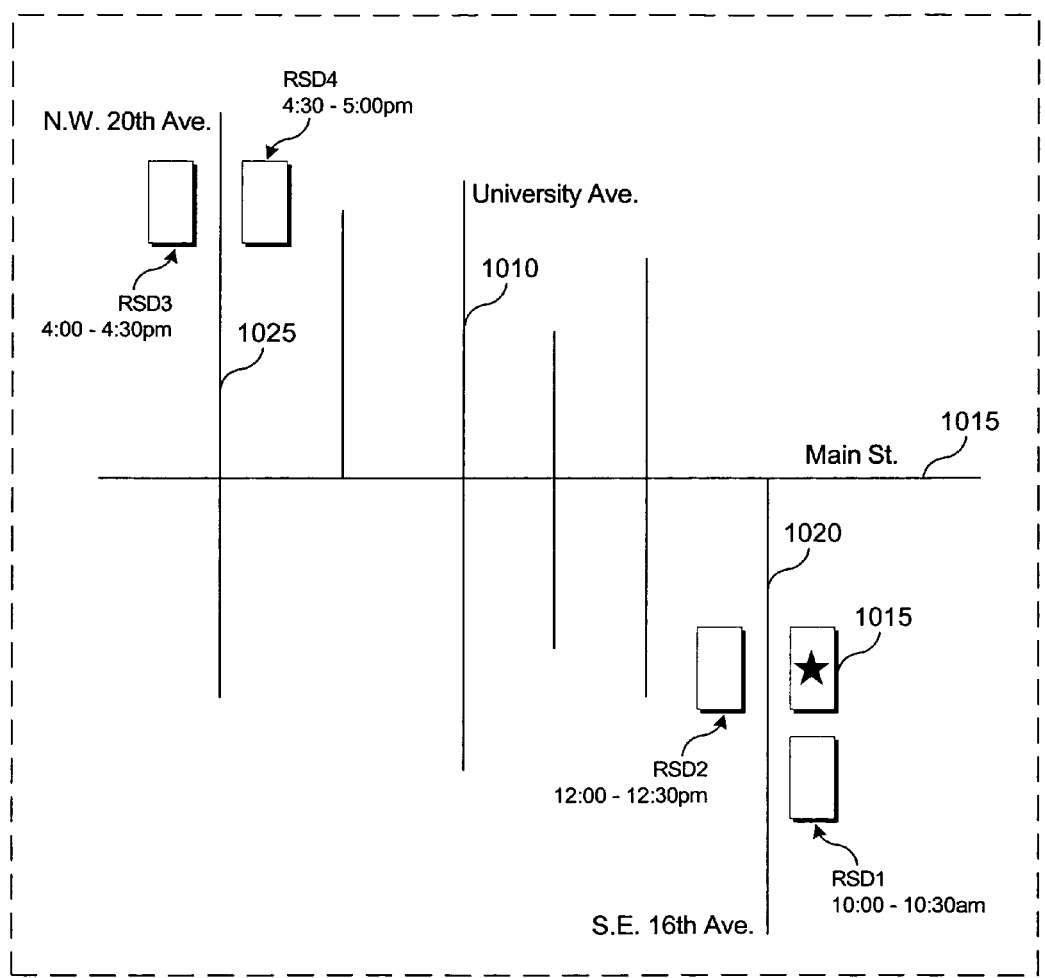

FIG. 10 is an annotated map that illustrates a scheduling example discussed in the "System Implementation" section of this specification.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by one skilled in the art, the present invention may be embodied as a method, a data processing system, or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. More particularly, the present invention may take the form of web-implemented computer software. Any suitable computer-readable storage medium may be utilized including hard disks, CD-ROMs, optical storage devices, or magnetic storage devices.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

System Architecture

FIG. 1 shows a block diagram of a delivery scheduling system 10 according to a preferred embodiment of the present invention. As may be understood from this figure, the delivery scheduling system 10 includes a Delivery Scheduling Server 50, one or more computer networks 20, 35, a web server 25, an automated phone system (or "Automated Attendant") 30, one or more Intended Recipient Telephones 12, an Intended Recipient Client Computer 14, and one or more Intended Recipient Mobile Electronic Devices 16. As will be appreciated by one of ordinary skill in the art, the one or more computer networks 20, 35 facilitate communication between the Intended Recipient Client Computer 14, the web server 25, the automated phone system 30, and the Delivery Scheduling Server 50. These one or more computer networks 20, 35 may include any of a variety of types of computer networks such as the Internet, a private intranet, a public switch telephone network (PSTN), or any other type of network known in the art. In a preferred embodiment of the invention shown in FIG. 1, both the communication link between the Intended Recipient Client Computer 14 and the web server 25, and the communication link between the Intended Recipient Mobile Electronic Devices 16 and the web server 25 are implemented via the Internet using Internet protocol (IP). The communication links between the web server 25, the Automated Attendant 30, and the Delivery Scheduling Server 50 preferably are implemented via a Local Area Network (LAN). The communication link between the Intended Recipient Telephone 12 and the Automated Attendant 30 is preferably implemented via a standard phone line.

FIG. 2 shows a block diagram of an exemplary embodiment of the Delivery Scheduling Server 50 of FIG. 1. The Delivery Scheduling Server 50 includes a processor 60 that communicates with other elements within the Delivery Scheduling Server 50 via a system interface or bus 61. Also included in the Delivery Scheduling Server 50 is a display device/input device 64 for receiving and displaying data. This display device/input device 64 may be, for example, a keyboard, voice recognition, or pointing device that is used in combination with a monitor. The Delivery Scheduling Server 50 further includes memory 66, which preferably includes both read only memory (ROM) 65 and random access memory (RAM) 67. The server's ROM 65 is used to store a basic input/output system 68 (BIOS), containing the basic routines that help to transfer information between elements within the Delivery Scheduling Server 50.

In addition, the Delivery Scheduling Server 50 includes at least one storage device 63, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for the personal computer 20. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. Such program modules include an operating system 80, a Delivery Time Scheduling Module 300, and an Alternate Delivery Date Scheduling Module 700. The Delivery Time Scheduling Module 300 and Alternate Delivery Date Scheduling Module 700 control certain aspects of the operation of the Delivery Scheduling Server 50, as is described in more detail below, with the assistance of the processor 60 and an operating system 80.

Also located within the Delivery Scheduling Server 50 is a network interface 74 for interfacing and communicating with other elements of a computer network. It will be appreciated by one of ordinary skill in the art that one or more of the Delivery Scheduling Server 50 components may be located geographically remotely from other Delivery Scheduling Server 50 components. Furthermore, one or more of the components may be combined, and additional components performing functions described herein may be included in the Delivery Scheduling Server 50.

Definitions

As used in this specification, the following terms have the meanings set forth below:

A "time window" is a discrete block of time during which a particular delivery may be scheduled. For example, a delivery may be scheduled to be made within a 9:00 am-10:00 am time window. In this example, the scheduled delivery should be made sometime between 9:00 am and 10:00 am.

"Contact information" is information that may be used to initiate electronic contact with the intended recipient of a package or other item. Examples of contact information include the intended recipient's home phone number, work phone number, fax number, beeper number, web address and e-mail address.

The term "schedule a time" for a delivery means to schedule a delivery to be made either at a particular time or within a particular time window.

The term "automatically" means substantially without human intervention.

A "delivery route" (or, simply, "route") is a series of scheduled deliveries that are performed by a single delivery vehicle.

A "regularly-scheduled stop" is a visit, by a delivery service to a customer, that occurs according to a substantially regular schedule. For example, if a delivery service is scheduled to visit a particular business every other business day at about 3:00 pm, any particular visit to the particular business according to this schedule would be a regularly-scheduled stop.

An "irregular stop" is a visit, by a delivery service to a customer, that does not occur according to a substantially regular schedule. For example, if a delivery service is scheduled to make a delivery to a customer that the delivery service does not visit according to a substantially regular schedule, the delivery would be considered an irregular stop. Such irregular stops are commonly deliveries to individual homes and small businesses that do not send or receive large volumes of packages.

The term "real-time" as applied to executing a series of steps indicates that the steps are executed in a substantially immediate manner. Accordingly, when a system is executing a series of steps in real time, a user would reasonably expect the system to execute the steps while the user waits. Similarly, the user would reasonably expect the system to execute the steps in a reasonably short period of time. Preferably, a system executing a series of steps in real-time would normally execute the steps in 1 minute or less.

Brief Overview of System Functionality

A system according to a preferred embodiment of the invention is configured to reduce the cost associated with making deliveries from package senders to intended package recipients by allowing at least some intended package recipients to schedule the delivery of the packages that they are scheduled to receive. Generally speaking, after the system receives a signal indicating that a particular package is to be delivered to an intended recipient, the system determines whether to allow the intended recipient to attempt to schedule delivery of the package. If so, the system attempts to identify contact information for the intended recipient and to use the identified contact information to establish contact with the intended recipient. In a preferred embodiment of the invention, the sender and the intended recipient are different entities.

If the system is able to establish contact with the intended recipient before an established cut-off time, the system again determines whether to allow the intended recipient to schedule the delivery based on the delivery service's current delivery schedule. For example, the system determines whether to allow the intended recipient to schedule the delivery to be made: (1) within one or more particular time windows on the day on which the package is tentatively scheduled to be delivered (the "tentative delivery date"); (2) before a different delivery deadline on the tentative delivery date than the delivery deadline specified by the sender; or (3) on a different date than the tentative delivery date. If the system determines to allow the intended recipient to schedule the delivery in one or more of the above ways, the system then allows the intended recipient to schedule the delivery appropriately. A delivery service then schedules the delivery to be made according to the schedule established by the intended recipient.

By allowing the intended recipient to schedule the delivery, the system increases the chances of delivering the package to the intended recipient on the first delivery attempt. This, in turn, reduces the cost of delivering the package. In some cases, the system may allow intended recipients to specify that a package may be delivered later than specified by the sender. This provides the delivery service with greater flexibility to schedule the package to be delivered at a time when the costs associated with making the delivery are at a minimum. In some cases, if the intended recipient specifies that the package need not be delivered until several days later than the delivery date specified by the sender, the delivery service may modify the mode of transportation for the package. For example, the delivery service may decide to send a package by truck rather than by air if it is still possible to make the delivery by truck and still satisfy the schedule specified by the intended recipient. Again, this can reduce the costs associated with making the delivery while still completing the delivery to the satisfaction of all parties involved.

As noted above, a system according to a preferred embodiment of the invention is configured to execute a Delivery Time Scheduling Module 300 and an Alternate Delivery Date Scheduling Module 700. A Delivery Time Scheduling Module 300 and an Alternate Delivery Date Scheduling Module 700 according to a preferred embodiment of the invention are described in detail below.

Delivery Time Scheduling Module

An exemplary embodiment of a Delivery Time Scheduling Module 300 according to the present invention is illustrated in FIGS. 3A-3E, which depict various steps performed in computer-executable code. At beginning step 302, the system receives a signal that a particular package is to be delivered to an intended recipient. This signal may be generated in many different ways. However, in a preferred embodiment of the invention, the signal is typically generated in response to the occurrence of one of the following events: (1) a sender uses an online delivery scheduling screen, such as UPS' "On Call Air Pickup"® screen, or the Internet Shipping System at www.ups.com, to request that a package be delivered from the sender's home or place of business to an intended recipient; (2) a sender uses an on-line ordering system to purchase an item and to arrange for the item to be shipped directly to the intended recipient (for example, as a gift); (3) a sender drops off a package at a postal center (such as Mail Boxes Etc.) and arranges for the package to be delivered to the intended recipient; (4) a delivery service picks up a package from a package drop-off kiosk and enters the delivery information into a computer; or (5) a package arrives at a sorting facility, where package information is either scanned from a surface of the package, decoded from a signal (such as a signal from an RFID tag) transmitted by the package, or read by an operator and manually entered into a computer system.

In a preferred embodiment of the invention, the signal indicating that the package is to be delivered includes one or more of the following types of information: (1) package information (e.g., the size, and/or weight of the package); (2) delivery information (e.g., the requested schedule for delivery of the package, and/or the requested method of transportation for the package); and (3) recipient information (e.g., the intended recipient's name, address, home phone number, work phone number, fax number, beeper number, web page address, and/or e-mail address).

After receiving the signal indicating that the package is to be delivered, the system proceeds to Step 304, where it identifies a tentative delivery date on which the package is initially scheduled to be delivered. The system preferably does this by executing one of many publicly available routing and scheduling programs, such as Roadnet 5000, which are well known in the art. "User's Guide to Roadnet 5000, Routing and Scheduling System, Version 5.6" (Roadnet Technologies, Inc. 1996), and "Roadnet 5000, Operations Guide, Version 6.02" (Roadnet Technologies, Inc. 1997) are incorporated herein by reference.

In one embodiment of the invention, the system is configured to identify the tentative delivery date of Step 304 by using a level of service (e.g., Next Day Air) associated with the package to determine a tentative delivery date for the package. For example, in one embodiment, if the system determines that a sender requested, on Monday, August 12, that a particular package be sent via Next Day Air, the system would automatically identify the next business day (Tuesday, August 13) as the tentative delivery date for the package.

Next, at Step 306, the system determines whether to allow the intended recipient to attempt to schedule the delivery. In a preferred embodiment of the invention, the system does this by determining whether it would be possible, and whether it would make business sense, to allow the intended recipient to schedule the package to be delivered within one or more particular time windows on the tentative delivery date. The system preferably does this in the manner taught in pending U.S. patent application Ser. No. 09/811,375, filed Mar. 16, 2001, which is entitled "Real-Time Delivery Feasibility Analysis Systems and Methods", published Oct. 10, 2002, Publication No. 2002/0147654, now U.S. Pat. No. 6,701,299, and which is hereby incorporated by reference.

If the system determines, at Step 306, that it should not allow the intended recipient to attempt to schedule the delivery, the system proceeds to Step 308, where it ends execution of the Delivery Time Scheduling Module 300. Otherwise, the system advances to Step 310.

At Step 310, the system determines whether contact information has been provided for the intended recipient. For example, the system determines whether the system has been provided with a phone number, fax number, beeper number, voice mail number, e-mail address, or web address for the intended recipient. This contact information may be provided by the sender when the sender arranges for the package to be delivered (e.g., on a delivery request web page), or the contact information may be included with the package and read by the delivery service during processing or routing of the package. For example, the package may include printed, typed, or bar-coded contact information on a surface of the package. In such a case, the delivery service may access the information using standard bar coding or OCR techniques. The package may also include an RF transmitter (e.g., an RFID tag) that is configured for transmitting the contact information via an RF signal. In this case, the delivery service may obtain the recipient contact information by receiving and decoding the RF signal.

If the system determines that contact information has not been provided for the intended recipient, the system proceeds to Step 312 where it attempts to identify contact information for the intended recipient. In a preferred embodiment of the invention, the system does this by searching one or more databases of information using any information that the system already has for the recipient as a key in searching the databases. The databases may either be internal databases (i.e., databases that are developed and maintained by the delivery service) or external databases (i.e., databases that are developed and maintained by entities other than the delivery service).

In a preferred embodiment of the invention, the delivery service maintains a customer information acquisition service that is set up to allow intended recipients to establish an on-going recipient profile with the delivery service. In a preferred embodiment of the invention, customers (e.g., recipients of packages) may access this customer information acquisition service via a Web Page (such as the delivery service's home page) and enter or modify their recipient profile as needed. However, as will be understood by one skilled in the art, the customer information acquisition service may also be set up to accept customer information via telephone, e-mail, U.S. mail, fax, or any other method of information transfer.

The recipient profile preferably includes contact information for the intended recipient, and also may include other information such as the recipient's preferences for delivery (e.g., a standing preferred time and place for any deliveries to be made to the recipient), and current availability of the recipient to receive packages (for example, the intended recipient may specify certain dates—such as vacation dates—on which the recipient will not be available to accept deliveries).

In one embodiment of the invention, the customer may specify an alternate delivery location for any dates on which the recipient will be unavailable to accept deliveries. For example, a particular recipient may specify that, between Nov. 21, 2002 and Dec. 15, 2002, all of the their packages should be delivered to their next-door neighbor for safe keeping. The customer may also specify that any deliveries made during these dates need not be delivered on an expedited basis, provided that the packages arrive by a certain date, such as the date that the recipient is scheduled to return from a vacation. As will be understood by one skilled in the art in light of the above disclosure, the customer profile may contain a wide variety of other delivery-related information for the particular customer.

In a preferred embodiment of the invention in which the system maintains a database of customer profiles as discussed above, at Step 312, the system uses the intended recipient's name and/or address information to search the database for a corresponding recipient profile. The system then extracts the recipient's contact information from the database in a manner well known in the art.

In one embodiment of the invention, if the system is unsuccessful in locating contact information from a first database, the system may proceed to search one or more backup databases for the intended recipient's contact information. For example, if the system can not locate a customer profile for the intended recipient within its internal customer profile database, the system may check an external phone directory to locate a phone number for the intended recipient. Alternately, the system may use any of a wide variety of other publicly available databases to obtain proper contact information for the intended recipient.

After attempting to identify contact information for the intended recipient at Step 312, the system proceeds to Step 314 where it determines whether the attempt to identify contact information for the intended recipient was successful. If not, proceeds to Step 316 where it ends execution of the Delivery Time Scheduling Module 300. If so, the system advances to Step 320, where it attempts to initiate immediate interactive contact with the intended recipient. In a preferred embodiment of the invention, the system uses the recipient's contact information to initiate communication with the intended recipient substantially automatically in response to identifying contact information for the recipient. For example, in response to identifying a phone number for the intended recipient, the system may automatically arrange for an automated attendant 30 to attempt to contact the intended recipient at the intended recipient's phone number. In an alternate embodiment of the invention, the system may attempt to initiate immediate interactive contact with the intended recipient by arranging for a customer service representative to contact the intended recipient by phone.

After attempting to initiate immediate interactive contact with the intended recipient at Step 320, the system advances to Step 322 where it determines whether the attempt to initiate immediate interactive contact with the intended recipient was successful. If not, the system sends a message to the intended recipient indicating that they are scheduled to receive a delivery, and that they may attempt to schedule the delivery by contacting the delivery service before a predetermined scheduling cutoff date and time (i.e., a cutoff deadline). For example, the system may send the intended recipient a message indicating that they are scheduled to receive a delivery on Jun. 11, 2003 and that the intended recipient may attempt to schedule the delivery by contacting the delivery service by a pre-determined cutoff deadline of 11:00 pm on Jun. 10, 2003. In one embodiment of the invention, the cutoff deadline is established based on a cutoff time for finalizing a particular delivery route.

In a preferred embodiment of the invention, the message sent to the intended recipient includes contact information for the delivery service, such as a phone number, e-mail address, web page address or other information that the intended recipient may use to contact the delivery service. The phone number is preferably either be a direct phone number to a human operator, or a link to an automated attendant 30. In a preferred embodiment of the invention, the message includes a phone number that may be used to contact an automated attendant 30 at the delivery service. In another embodiment of the invention, the message includes an address for the delivery service's home page. The contact information is preferably configured to allow the intended recipient to automatically access information regarding the package (such as the tentative delivery date of the package) and to attempt to schedule delivery of the package.

As will be understood by one skilled in the art, the system may use many different methods to send the message of Step 324. For example, the system may: (1) send the intended recipient an e-mail; (2) leave a message on the intended recipient's answering machine; (3) send an electronic message to the intended recipient's pager or PDA; (4) post a message to the intended recipient's web site; or (5) send the intended recipient a paper message via regular or expedited mail.

In a preferred embodiment of the invention, if the system is not able to contact the intended recipient via a first type of contact information, the system will attempt to identify additional contact information for the intended recipient and, if successful, attempt to contact the intended recipient via this additional contact information. Thus, for example, if the system were unable to reach the intended recipient by calling the intended recipient's home phone number, and if the system had access to the intended recipient's e-mail address, the system would attempt reach the intended recipient via e-mail.

In some situations, it may not be possible to leave a message with the intended recipient. For example, the only contact information that the system may have for the recipient may be a phone number that has no active voice mail service. In this case, if the intended recipient does not answer the phone, it may not be possible to leave a message for the intended recipient. If the system is not able to immediately contact, or leave a message for, the intended recipient, the system preferably stops execution of the Delivery Time Scheduling Module 300 and schedules delivery of the package without input from the intended recipient. Alternately, the system may attempt to contact the recipient one or more additional times before finally scheduling delivery of the package without recipient input.

After sending the intended recipient a message at Step 324, the system advances to Step 326 where it waits to determine whether the intended recipient contacts the delivery system before the pre-determined cutoff date and time. If not, the system advances to Step 348, where it ends execution of the Delivery Time Scheduling Module 300.

If the system determines at Step 326 that the intended recipient contacted the delivery service before the pre-determined cutoff date and time, the system advances to Step 332 where it determines whether the system should allow the intended recipient to attempt to schedule the delivery. In making this determination, the system preferably takes into account any deliveries that the system has scheduled between the time that the system initially determined, at Step 306, to allow the intended recipient to schedule the delivery, and the time that the intended recipient actually contacted the system to attempt to schedule the delivery. If the system determines, at Step 332, that the system should not allow the intended recipient to schedule the delivery, the system simply notifies the intended recipient that it is no longer possible to schedule the delivery. The system then proceeds to Step 348 where it ends execution of the Delivery Time Scheduling Module 300.

If the system determines either: (1) at Step 332 that the system should allow the intended recipient to attempt to schedule the delivery; or (2) at Step 322 that the attempt to initiate immediate contact with the intended recipient was successful, the system proceeds to Step 334. At Step 334, the system offers to allow the intended recipient to attempt to schedule the delivery to be made within a particular time window on the tentative delivery date. In a preferred embodiment of the invention, this is done while the system is in interactive contact with the intended recipient. For example, this may be done via an automated phone-based scheduling system, a web page, a series of instant messages, or via a human operator. However, in a preferred embodiment of the invention, the entire interaction between the system and the intended recipient is normally automated to reduce the cost of implementing the system and to decrease the time required for the intended recipient to schedule the delivery.

Next, the system proceeds to Step 336 where it determines whether the intended recipient would like to attempt to schedule the delivery. If not, the system proceeds to Step 348 where it ends execution of the Delivery Time Scheduling Module 300. The system then schedules the delivery without input from the intended recipient.

If the system determines, at Step 336, that the intended recipient would like to try to attempt to schedule the delivery, the system proceeds to Step 338 where it identifies one or more time windows in which the delivery service would be willing to deliver the package to the intended recipient on the tentative delivery date. In a preferred embodiment of the invention, in identifying the one or more time windows, the system takes into account the effect that offering to make the delivery within each time window would have on the delivery route of a truck making the delivery. In one embodiment, such a route may comprise a series of regularly scheduled stops and a predetermined path extending between the regularly scheduled stops, and the time window may be selected to minimize any diversion from the predetermined path required to make the delivery.

Next, the system proceeds to Step 340 where it informs the intended recipient of the time windows identified in Step 338. The system then advances to Step 342 where it allows the intended recipient to indicate whether they would like to schedule the delivery to be made within one of the time windows identified in Step 338 and, if so, which one. In a preferred embodiment of the invention, the system allows the intended recipient to select a time window via a graphical user interface (GUI) presented on a web site operated by the delivery service. However, this may also be accomplished by an exchange of e-mails, an exchange of text messages with a customer mobile device (e.g., a cell phone, a pager, or a PDA), an exchange of postings between the delivery service's web site and the intended recipient's web site, presenting a menu on a mobile device screen, presenting a menu audibly by an automated attendant over a telephone line, or other communication interfaces.

Next, the system determines, at Step 344, whether the intended recipient indicated that they would like to schedule the delivery to be made within a selected one of the identified time windows on the tentative delivery date. If not, the system proceeds to Step 348 where it ends execution of the Delivery Time Scheduling Module 300 and schedules the delivery without input from the intended recipient. If so, the system proceeds to Step 346 where it schedules the delivery to be made within the selected time window on the tentative delivery date. The system then ends execution of the Delivery Time Scheduling Module at Step 348.

In a preferred embodiment of the invention, the system executes Steps 338-346 in the manner described in pending U.S. patent application Ser. No. 09/811,375, filed Mar. 16, 2001, entitled "Real-Time Delivery Feasibility Analysis Systems and Methods", published Oct. 10, 2002, Publication No. 2002/0147654, now U.S. Pat. No. 6,701,299, and which is hereby incorporated by reference. Furthermore, Steps 338-346 are preferably executed in real time.

Delivery Time Scheduling Module—Exemplary Transaction

FIGS. 4 through 6 help to demonstrate an exemplary transaction using a system according to a preferred embodiment of the invention. In this example, on Jun. 9, 2002 a package sender logs on to a delivery service's website and requests that the delivery service pick up a package from the sender and deliver the package to the intended recipient via second day air delivery. In making the pickup/delivery request, the package sender provides the intended recipient's name and address, but does not provide any immediate contact information for the intended recipient such as the intended recipient's phone number or e-mail address. In response to the sender making the pickup/delivery request, the website generates and transmits a signal indicating that the package is to be delivered to the intended recipient. The system then receives this signal according to Step 302 of FIG. 3.

Next, according to Step 304, the system identifies Jun. 11, 2002 as the tentative delivery date for the package. The system then executes Step 306 and, in doing so, determines to allow the intended recipient to schedule the delivery as detailed above. In particular, the system determines that the delivery service would be willing to allow the intended recipient to schedule the delivery to be made within at least one particular time window on Jun. 11, 2002.

Next, in executing Step 310, the system determines that contact information has not been provided for the intended recipient. As a result, the system advances to Step 312, where it identifies contact information for the intended recipient by accessing an internal database of recipient profiles. In this example, the system is able to identify a home phone number and an email address for the recipient within the recipient database. According to Step 314, the system then determines that the attempt to identify contact information for the intended recipient was successful.

The system then advances to Step 320 where it attempts to initiate interactive contact with the intended recipient by having an automated attendant call the intended recipient at home. In this example, the intended recipient is not home when the automated attendant calls and no voice mail is available at the intended recipient's home. As a result, the system determines, at Step 322, that the attempt to initiate immediate interactive contact with the intended recipient was not successful. The system then advances to Step 324, where it generates an e-mail indicating that the intended recipient is scheduled to receive a package on Jun. 11, 2002 and that the recipient may attempt to schedule the delivery to be made within a particular time window on June 11 by: (1) logging on to the delivery service's web page (for example, www.ups.com) before Jun. 10, 2002 at 5:00 pm; (2) entering a particular tracking number; and (3) selecting a "schedule delivery" option on the web page.

After receiving the e-mail, the intended recipient logs on to the delivery service's web page on Jun. 10, 2002 at 9:00 am, enters the tracking number for the package, and selects the "schedule delivery" option. In response to the intended recipient entering the tracking number for the package and selecting a schedule delivery option, the system displays a "Schedule Delivery-Inquiry" window, such as the "Schedule Delivery-Inquiry" window 400 of FIG. 4. As shown in this figure, this window again informs the intended recipient via a message 410 that they are scheduled to receive a package on the tentative delivery date (Wednesday, Jun. 11, 2002).

Next, according to Step 332, the system very quickly determines whether to allow the intended recipient to schedule the delivery. In this example, the system determines that it should. Accordingly, per Steps 334 and 336, the system displays a message asking whether the intended recipient would like to schedule a convenient time for the delivery to be made on the tentative delivery date. The system also displays input buttons 420, 430 that the intended recipient may use to indicate whether they would like to schedule the delivery.

In this example, the intended recipient wishes to schedule the delivery. Accordingly, the intended recipient selects the "schedule delivery" input button 420 indicating that they would like to schedule the delivery. In response to the intended recipient selecting the "schedule delivery" input button 420, the system advances to Step 338 where it identifies any time windows on the tentative delivery date in which the delivery service would be willing to make the delivery. In this example, the system identifies three such time windows, which are as follows: (1) 10:00 am 11:00 am; (2) 11:00 am-12:00 pm; and (3) 3:00 pm-4:00 pm.

As shown in FIG. 5, and according to Steps 340 and 342, the system then displays a "Schedule Delivery" window 500 that includes one time window selection button 520-540 for each identified time window, along with a message 510 instructing the intended recipient that the intended recipient may select one of the time windows for the delivery by selecting a corresponding one of the time windows selection buttons 520-540. The system also indicates that the intended recipient may cancel the scheduling process by selecting a cancel button 550 within the "Schedule Delivery" window 500.

In this example, the intended recipient selects the "11:00 am-12:00 pm" time window selection button 530 to indicate that they would like the delivery to be made within the 11:00 am-12:00 pm time window. In response to the intended recipient selecting the time window selection button 530, the system schedules the delivery to be made within the selected time window on the tentative delivery date per Step 346. The system then displays a "Schedule Delivery Confirmation Window" 600.

As may be understood from FIG. 6, the Schedule Delivery Confirmation Window 600 preferably includes a confirmation message 610 confirming that the delivery has been scheduled to be made within the selected time window on the indicated delivery date. In a preferred embodiment of the invention, the system also displays a scheduling confirmation number for the intended recipient's reference.

Alternate Delivery Date Scheduling Module

In one embodiment of the invention, the system is configured to allow the intended recipient of a package to schedule the package to be delivered on a day other than the tentatively scheduled delivery date. This may be advantageous, for example, in a situation in which the intended recipient is not going to be available to receive the delivery on the tentative delivery date but would be available on another day. In a preferred embodiment of the invention, the system uses an Alternate Delivery Date Scheduling Module 700 to allow the intended recipient to schedule an alternate date for the delivery.

An exemplary embodiment of an Alternate Delivery Date Scheduling Module 700 according to the present invention is illustrated in FIGS. 7A-7F, which depict various steps performed in computer-executable code. At beginning step 702, the system receives a signal that a particular package is to be delivered to an intended recipient. This signal may be generated in many different ways. However, in a preferred embodiment of the invention, the signal is typically generated in response to the occurrence of one of the following events: (1) a sender uses an on-line pickup scheduling screen, such as UPS' "On Call Air Pickup"® screen or a screen within UPS' Online Scheduling System at www.ups.com, to request that a package be delivered from the sender's home or place of business to an intended recipient; (2) a sender uses an on-line ordering system to purchase an item and to arrange for the item to be shipped directly to the intended recipient (for example, as a gift); (3) a sender drops off a package at a postal center (such as Mail Boxes Etc.) and arranges for the package to be delivered to the intended recipient; (4) a delivery service picks up a package from a package drop-off kiosk and enters the delivery information into a computer; or (5) a package arrives at a sorting facility, where package information is either scanned from a surface of the package or read by an operator and manually entered into a computer system.

As noted above in respect to the Delivery Time Scheduling Module, in a preferred embodiment of the invention, the signal indicating that the package is to be delivered includes one or more of the following types of information: (1) package information (e.g., the size, and/or weight of the package); (2) delivery information (e.g., the requested schedule for delivery of the package, and/or the requested method of transportation for the package); and (3) recipient information (e.g., the intended recipient's name, address, home phone number, work phone number, fax number, beeper number, web page address, and/or e-mail address).

After receiving the signal indicating that the package is to be delivered, the system proceeds to Step 704, where it identifies a tentative delivery date on which the package is initially scheduled to be delivered. The system preferably does this by executing a standard routing and scheduling program, such as Roadnet 5000.

Next, at Step 706, the system determines whether to allow the intended recipient to attempt to schedule the delivery to be made on a date other than the tentative delivery date. In a preferred embodiment of the invention, the system does this by determining whether it would be possible, and whether it would make business sense, to allow the intended recipient to schedule the package to be delivered on one or more days other than the tentative delivery date. The system preferably does this in accordance with the techniques taught in pending U.S. patent application Ser. No. 09/811, 375, filed Mar. 16, 2001, entitled "Real-Time Delivery Feasibility Analysis Systems and Methods", published Oct. 10. 2002, Publication No. 2002/0147654, now U.S. Pat. No. 6,701,299, and which, as noted above, is incorporated herein by reference.

In one embodiment of the invention, the system makes the determination at Step 706 by analyzing whether it would be possible, and whether it would make business sense, to allow the intended recipient to schedule delivery of the package to be made on any one of the three business days immediately following the tentatively scheduled delivery day. However, as will be understood by one skilled in the art in light of the above disclosure, any convenient set of rules may be applied in making this determination. For example, the system may be configured to conclude that it should allow the intended recipient to schedule the delivery to be made on an alternate delivery date if it would be possible to deliver the package on any of the six business days immediately following the tentative delivery date.

If the system determines, at Step 706, that it should not allow the intended recipient to attempt to schedule the delivery to be made on an alternate delivery date, the system proceeds to Step 708, where it ends execution of the Alternate Delivery Date Scheduling Module 700. Otherwise, the system advances to Step 710.

At Step 710, the system determines whether contact information has been provided for the intended recipient. For example, the system determines whether the system has been provided with a phone number, fax number, beeper number, voice mail number, e-mail address, or web address for the intended recipient. If not, the system proceeds to Step 712 where it attempts to identify contact information for the intended recipient. In a preferred embodiment of the invention, the system does this by searching one or more databases of information using any information that the system already has for the recipient as a key in searching the databases. The databases may either be internal databases (i.e., databases that are developed and maintained by the delivery service) or external databases (i.e., databases that are developed and maintained by entities other than the delivery service.)

In a preferred embodiment of the invention in which the system maintains a database of customer profiles as discussed above, at Step 712, the system uses the intended recipient's name and/or address to search the database for a corresponding recipient profile. The system then extracts the contact information from the database in a manner well known in the art.

If the system is unsuccessful in locating contact information from a first database, the system may proceed to search one or more backup databases. For example, if the system can not locate a customer profile for the intended recipient within its internal customer profile database, the system may check an external telephone directory to locate a phone number for the intended recipient. As will be understood by one skilled in the art, the system may use any of a wide variety of publicly available databases to obtain proper contact information for the intended recipient.

After attempting to identify contact information for the intended recipient at Step 712, the system proceeds to Step 714 where it determines whether the attempt to identify contact information for the intended recipient was successful. If not, the system proceeds to Step 716 where it ends execution of the Alternate Delivery Date Scheduling Module 700. If so, the system advances to Step 718, where it attempts to initiate immediate interactive contact with the intended recipient.

Next, the system advances to Step 720 where it determines whether the attempt to initiate immediate interactive contact with the intended recipient was successful. If not, the system sends a message to the intended recipient indicating that they are scheduled to receive a delivery, and that they may attempt to schedule the delivery by contacting the delivery service before a predetermined scheduling cutoff date and time. For example, the system may send the intended recipient a message indicating that they are scheduled to receive a delivery and that they may attempt to schedule the delivery by contacting the delivery service at a particular phone number, e-mail address, or web page by 11:00 pm on Jun. 11, 2003.

As will be understood by one skilled in the art, the system may use many different methods to send the message of Step 724. For example, the system may: (1) send the intended recipient an e-mail; (2) leave a message on the intended recipient's answering machine; (3) send an electronic message to the intended recipient's pager or PDA; (4) post a message to the intended recipient's web site; or (5) send the intended recipient a paper message via regular or expedited mail.

In a preferred embodiment of the invention, if the system is not able to contact the intended recipient via a first type of contact information, the system will attempt to identify additional contact information for the intended recipient and, if successful, attempt to contact the intended recipient via this additional contact information. Thus, for example, if the system were unable to reach the intended recipient by calling the intended recipient's home phone number, and if the system had access to the intended recipient's e-mail address, the system would attempt reach the intended recipient via e-mail.

In some situations, it may not be possible to leave a message with the intended recipient. For example, the only contact information that the system may have for the recipient may be a phone number that has no active voice mail service. In this case, if the intended recipient does not answer the phone, it may not be possible to leave a message for the intended recipient. If the system is not able to immediately contact, or leave a message for, the intended recipient, the system preferably stops execution of the Alternate Delivery Date Scheduling Module 700 and schedules delivery of the package without input from the intended recipient. Alternately, the system may attempt to contact the recipient one or more additional times before finally scheduling delivery of the package without recipient input.

After sending the intended recipient a message at 724, the system advances to Step 726 where it waits to determine whether the intended recipient contacts the delivery system before the pre-determined cutoff date and time. If not, the system advances to Step 728, where it ends execution of the Alternate Delivery Date Scheduling Module 700.

If the system determines at Step 726 that the intended recipient contacted the delivery service before the pre-determined cutoff date and time, the system advances to Step 732 where it determines whether the system should allow the intended recipient to attempt to schedule the delivery to be made on a date other than the tentative delivery date. In making this determination, the system preferably takes into account any deliveries that the system has scheduled between: (1) the time that the system initially determined, at Step 706, to allow the intended recipient to schedule the delivery for an alternate date; and (2) the time that the intended recipient actually contacted the system to attempt to schedule the delivery. If the system determines, at Step 732, that the system should not allow the intended recipient to schedule the delivery to be made on an alternate date, the system simply notifies the recipient that it is no longer possible to schedule the delivery for an alternate date. The system then proceeds to Step 748 where it ends execution of the Alternate Delivery Date Scheduling Module 700.

If the system determines either: (1) at Step 732 that the system should allow the intended recipient to attempt to schedule the delivery to be made on a date other than the tentative delivery date; or (2) at Step 720 that the attempt to initiate immediate contact with the intended recipient was successful, the system proceeds to Step 734. At Steps 734 and 736, the system determines, through communication with the intended recipient, whether the intended recipient would like to attempt to schedule the delivery to be made on a date other than the tentative delivery date. In a preferred embodiment of the invention, this is done while the system is in interactive contact with the intended recipient. For example, this may be done via an automated phone-based scheduling system, a web page, a series of instant messages, or via a human operator. However, in a preferred embodiment of the invention, the entire interaction between the system and the intended recipient is normally automated to reduce the cost of implementing the system and to decrease the time required for the intended recipient to schedule the delivery.

If the intended recipient would not like to try to schedule the intended delivery for an alternate date, the system proceeds to Step 748 where it ends execution of the Alternate Delivery Date Scheduling Module 700 and schedules the delivery to be made on the tentative delivery date.

However, if the system determines, at Step 736, that the intended recipient would like to try to attempt to schedule the delivery for an alternate date, the system proceeds to Step 738 where it identifies any days other than the tentative delivery date on which the delivery service would be willing to make the delivery. In one embodiment of the invention, when executing Step 738, the system determines whether it would be possible, and whether it would make business sense, to allow the intended recipient to schedule delivery of the package on one or more of the three business days immediately following the tentatively scheduled delivery day. Thus, in this embodiment of the invention, the pool of days that may be identified in Step 738 is limited to the three business days immediately following the tentatively scheduled delivery day.

As will be understood by one skilled in the art in light of the above disclosure, however, any convenient set of rules may be applied in identifying possible alternate dates for the delivery at Step 738. For example, the system may be configured to conclude that it should allow the intended recipient to schedule the delivery to be made on an alternate delivery date if it would be possible to deliver the package on any of the six business days immediately following the tentative delivery date.

Next, at Step 740, the system informs the intended recipient of the alternate dates on which the delivery service would be willing to deliver the package to the intended recipient. The system then proceeds to Steps 742 and 744, where the system determines whether the intended recipient would like to schedule the delivery to be made on one of the indicated alternate days. If not, the system proceeds to Step 748 where it ends execution of the Alternate Delivery Date Scheduling Module 700 and schedules the delivery without input from the intended recipient. If so, the system proceeds to Step 746 where it receives the selected alternate delivery date and schedules the delivery to be made within the selected time window on the selected date. The system then advances to Step 748 where it ends execution of the Alternate Delivery Date Scheduling Module 700.

In a preferred embodiment of the invention, the system executes Steps 738-746 in the manner described in pending U.S. patent application Ser. No. 09/811,375, filed Mar. 16, 2001, entitled "Real-Time Delivery Feasibility Analysis Systems and Methods", published Oct. 10, 2002, Publication No. 2002/0147654, now U.S. Pat. No. 6,701.299, which is hereby incorporated by reference. Furthermore, Steps 738-746 are preferably executed in real time.

Alternate Delivery Date Scheduling Module—Exemplary Transaction

FIGS. 8 through 9 help to demonstrate an exemplary transaction using a system according to a preferred embodiment of the invention. In this example, on Jun. 9, 2002 a package sender logs on to a delivery service's website and requests that the delivery service pick up a package from the sender and deliver the package to an intended recipient via second day air delivery. In making the request, the package sender provides the intended recipient's name and address, but does not provide any immediate contact information for the intended recipient such as the intended recipient's phone number or e-mail address. In response to the sender making the pickup/delivery request, the website generates and transmits a signal indicating that the package is to be delivered to the intended recipient. The system then receives this signal according to Step 702.

Next, according to Step 704, the system identifies Jun. 11, 2002 as the tentative delivery date for the package. The system then executes Step 706 and, in doing so, determines to allow the intended recipient to schedule the delivery to be made on an alternate delivery date as discussed above. In particular, the system determines that the delivery service would be willing to allow the intended recipient to schedule the delivery to be made on at least one of the three business days immediately following the tentative delivery date.

Next, in executing Step 710, the system determines that contact information (a home phone number and e-mail address) has been provided for the intended recipient. Accordingly, the system advances to Step 718 where it attempts to initiate interactive contact with the intended recipient by having an automated attendant call the intended recipient at home. In this example, the intended recipient is not home when the automated attendant calls and no voice mail is available at the intended recipient's home. As a result, the system determines, at Step 720, that the attempt to initiate immediate interactive contact with the intended recipient was not successful. The system then advances to Step 724, where it sends an e-mail to the intended recipient's e-mail address indicating that the intended recipient is scheduled to receive a package on Jun. 11, 2002. The e-mail further specifies that the recipient may attempt to schedule the delivery to be made on an alternate delivery date by: (1) logging on to the delivery service's web page (for example, www.ups.com) before Jun. 10, 2002 at 5:00 pm; and (2) entering a particular tracking number; and (3) selecting a "schedule delivery" option on the web page.

In response to receiving the e-mail, the intended recipient logs on to the delivery service's web page on Jun. 10, 2002 at 9:00 am enters the tracking number for the package, and selects the "schedule delivery" option on the web page. In response to the intended recipient entering the tracking number for the delivery and selecting a schedule delivery option, according to Step 726, the system determines that the intended recipient did contact the delivery service before the predetermined cutoff date. The system then advances to Step 732 where it very quickly determines whether to allow the intended recipient to schedule the delivery on a date other than the tentative delivery date (i.e., an "alternate" date). In this example, the system determines that it should.

Accordingly, the system advances to Step 734, where it displays a "Schedule Delivery Inquiry" window, such as the "Reschedule Delivery Date—Inquiry" window 800 of FIG. 8. According to Step 734, this window again informs the intended recipient that they are scheduled to receive a package on the tentative delivery date (Wednesday, Jun. 11, 2002) and offers to allow the intended recipient to attempt to schedule the delivery to be made on an alternate delivery date. The "Reschedule Delivery Date Inquiry" window 800 includes input buttons 820, 830 that the intended recipient may select to indicate whether they would like to schedule the delivery.

In this example, the intended recipient plans to be out of town on Jun. 11, 2002, but will be returning on Jun. 12, 2002. Accordingly, the intended recipient selects a "schedule delivery" input button 820 indicating that they would like to try to re-schedule the delivery to be made on a day other than Jun. 11, 2002. In response to the intended recipient selecting the "schedule delivery" input button 820, the system advances to Step 738 where it identifies any of the three business days immediately following the tentative delivery date on which the delivery service would be willing to make the delivery. In this example, the system determines that the delivery service would be willing to make the delivery on: (1) Wednesday, June 12; (2) Thursday, June 13; and (3) Friday, June 14.

As shown in FIG. 9, and according to Steps 740 and 742, the system then displays a "Reschedule Delivery Date" window 900 that includes one alternate delivery date selection button 920-940 for each identified alternate delivery date, along with a message 910 instructing the intended recipient that they may select one of displayed dates for the delivery by selecting one of the alternate delivery date selection buttons 920-940. The system also indicates that the intended recipient may cancel the scheduling process by selecting a cancel button 950 within the "Reschedule Delivery Date" window 900.

In this example, the intended recipient selects the "Wednesday, Jun. 12, 2002" alternate delivery date selection button 920 to indicate that they would like the delivery to be made on Wednesday, June 12. In response to the intended recipient selecting this selection button 920, the system advances to Step 746 where it receives the selected alternative delivery date and schedules the delivery to be made on the selected date. The system then displays a confirmation window (not shown) that preferably includes a confirmation message indicating that the delivery has been scheduled to be made on the selected alternate delivery date. In a preferred embodiment of the invention, the system also displays a scheduling confirmation number for the intended recipient's reference.

System Implementation

Many different embodiments of the present invention will be understood to one skilled in the art in light of the above disclosure. For example, it should be understood that while the Delivery Time Scheduling Module 300 and the Alternate Delivery Date Scheduling Module 700 are described above as being implemented together within a single system, either one of these modules may be implemented without the other within a particular system. Furthermore, the Delivery Time Scheduling Module 300 and the Alternate Delivery Date Scheduling Module 700 may be combined to form a single scheduling module that allows the intended recipient to schedule deliveries to be made: (1) on a tentative delivery date and within a particular timeframe (e.g., within a particular time window, or before or after a particular time) specified by the intended recipient; (2) on a date other than the tentative delivery date, but not within a timeframe specified by the intended recipient; or (3) on a date other than the tentative delivery date, and within a timeframe specified by the intended recipient.

In addition, although the Delivery Time Scheduling Module 300 is described above as allowing an intended recipient to schedule a delivery to be made within a particular time window, the Delivery Time Scheduling Module 300 may also be configured to allow an intended recipient to schedule deliveries to be made before or after a particular recipient-specified time threshold on a particular day. For example, if a package is scheduled to be delivered by a 10:00 am deadline on the tentative delivery date, the Delivery Time Scheduling Module 300 may be configured to allow the intended recipient to specify an alternate deadline for the delivery of, for example, 2:00 pm, 4:00 pm, 6:00 pm, or no deadline at all. This may be advantageous for the intended recipient if the intended recipient is sure that they will not be available to receive the package before the current deadline on the scheduled delivery day, but would be available to receive the package later in the day. In addition, allowing the intended recipient to schedule a later deadline may be advantageous for the delivery service because it provides more flexibility in scheduling the delivery to the intended recipient. This may make it possible for the delivery service to schedule the delivery to be made at a lower cost.

It should also be understood that, in scheduling deliveries, a particular delivery service may be scheduling the deliveries to be made between regularly scheduled stops. Such regularly scheduled stops may include, for example, daily pickup/delivery stops to various businesses. Thus, in determining whether to offer to make the delivery within a particular time window or before or after particular time, the system will preferably take into account the regularly scheduled stops, as well as other, previously-scheduled irregular stops. Accordingly, it may be advantageous to offer to make deliveries to irregular stops during the same time window in which the delivery service is scheduled to make a regularly scheduled delivery near the irregular stop.

An example of a situation in which it would be advantageous to offer to make a delivery to an irregular stop during the same time window in which the delivery service is scheduled to make a regularly scheduled stop near the irregular stop is shown in FIG. 10. This figure depicts a map of a portion of a delivery truck's delivery zone. More particularly, the map shows the geographical relationship between: (1) several different roads 1010-1025; (2) four different regularly scheduled delivery stops (RSD1-RSD4); and (3) an irregular stop 1030. As may also be understood from this figure, the delivery truck is scheduled to make deliveries to the first regularly scheduled delivery stop RSD1 between 10:00 am and 10:30 am, to the second regularly scheduled delivery stop RSD2 between 12:00 pm and 12:30 pm, to the third regularly scheduled delivery stop RSD3 between 4:00 pm and 4:30 pm, and to the fourth regularly scheduled delivery stop RSD4 between 4:30 pm and 5:00 pm.

In one embodiment of the invention, the system is configured to encourage users to schedule irregular deliveries to be made during the same (or similar) time window in which the delivery service is scheduled to make a regularly scheduled delivery near (e.g., within a predetermined threshold distance from) the irregular stop. For example, in the situation depicted in FIG. 10, the system is preferably configured to encourage the user to schedule a delivery to an irregular stop 1030 to be made within the 10:00 am-10:30 am or 12:00 pm-12:30 pm time windows. This is advantageous because the delivery truck is already scheduled to make deliveries to nearby regularly scheduled delivery stops (RSD1 and RSD2, respectively) during these time windows. Thus, scheduling the delivery to the irregular stop 1030 to be made within these time windows allows the delivery truck to make the irregular delivery without traveling far outside of its regular delivery route, which is defined by its regularly scheduled stops (such as RSD1-RSD4).

In one embodiment of the invention, the system encourages the user to select certain time windows by withholding all other time windows from display to the user. Thus, in this embodiment of the invention, the user may only schedule the delivery to be made within these certain time windows.

By the same token, the system is preferably configured to discourage users from scheduling irregular deliveries to be made during the same (or similar) time window in which the delivery service is scheduled to make a regularly scheduled delivery far away from (e.g., beyond a pre-determined threshold distance from) the irregular stop. For example, in the situation depicted in FIG. 10, the system is preferably configured to discourage the user from scheduling the delivery to the irregular stop 1030 to be made within the 4:00 pm-4:30 pm or 4:30 pm 5:00 pm time windows. This is advantageous because the delivery truck is scheduled to make deliveries during these time windows to regularly scheduled delivery stops (RSD3 and RSD3, respectively) that are far away from the irregular stop 1030. Avoiding scheduling the delivery to the irregular stop 1030 within these time windows prevents requiring the delivery truck to travel far outside its regular delivery route to make the irregular delivery.

In one embodiment of the invention, the system discourages intended recipients from selecting certain time windows by withholding the time windows from display to the user. Thus, in this embodiment of the invention, the user may only schedule the delivery to be made within other time windows.

It should be understood that, while the invention is described above as being applied to packages, the invention may be used to schedule the delivery of other items. For example, the invention may be used to schedule the delivery of items such as gifts (e.g., flowers, plants, or balloons), or consumer items that are delivered by a freight service rather than parcel delivery service.

Furthermore, the invention may used to schedule trips to customers that do not involve the delivery of items to the customer. For example, one embodiment of the system is configured to allow the customer to schedule pickups from, or service visits to, the customer's home that are ordered by someone other than the customer. This embodiment of the invention may be used, for example, in situations where a lending company has asked an appraiser to conduct an appraisal of a potential borrower's home. The system is preferably configured to automatically contact the potential borrower and automatically schedule a visit by the appraiser in the general manner set forth above.

It should also be understood that the system may be configured to allow other parties, aside from the intended recipient of a package, item, or service, to schedule deliveries. For example, the system may allow the intended recipient's secretary, spouse, or any other party to schedule the delivery.

CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of scheduling a delivery as an addition to a planned delivery route of a delivery vehicle, said planned delivery route including a plurality of regularly-scheduled stops and a predetermined path extending between said regularly-scheduled stops on a projected time schedule, said method comprising the steps of:
   (A) receiving, from a sender, an item and a request for delivery of said item at a selected level of service to a recipient;
   (B) scanning said item to retrieve delivery information;
   (C) determining whether said delivery requires departure from said planned delivery route;
   (D) determining, independent of parameters of said level of service, whether one or more cost-effective time windows exist in which a cost of delivery of said item to said recipient is equal to or below a predetermined cost threshold;
   (E) in response at least in part to determining (i) said delivery requires departure from said planned route and (ii) one or more of said cost-effective time windows exist, using said delivery information to automatically initiate the transmission of a message to said recipient via a communications system indicating that said recipient may schedule delivery of said item to said recipient within one of said one or more cost-effective time windows;
   (F) receiving a response from said recipient including a selection of one of said cost-effective time windows; and
   (G) scheduling said delivery to be made by said delivery vehicle within the selected one of said cost-effective time windows during said planned delivery route.

2. The method of scheduling of claim 1, wherein said step (E) further comprises the steps of: using said delivery information to identify contact information for said recipient; and using said contact information to contact said recipient.

3. The method of scheduling of claim 1, wherein said steps (B), (C), and (D) are performed automatically.

4. The method of scheduling of claim 1, wherein said step (G) is performed automatically.

5. The method of scheduling of claim 1, wherein said step (B) of scanning said package comprises scanning a surface of said item.

6. The method of scheduling of claim 1, further comprising:
   (H) repeating steps (A)-(G) to schedule one or more additional deliveries; and
   (I) departing from said predetermined path only during said cost-effective time windows.

7. The method of scheduling of claim 1, wherein said step (B) of scanning said item to retrieve delivery information further comprises retrieving said delivery information from a symbol on said item.

8. The method of scheduling of claim 1, wherein said step (B) of scanning said item to retrieve delivery information further comprises retrieving said delivery information from a database based on data acquired from a symbol on said item.

9. The method of scheduling of claim 1, wherein said sender and said recipient are different entities.

10. The method of scheduling of claim 1, wherein said Step (E) comprises sending said recipient an electronic message.

11. The method of scheduling of claim 10, wherein said electronic message includes a link to a web site.

12. The method of scheduling of claim 10, wherein said electronic message includes a phone number that is selected to allow said recipient to establish communication with a delivery service.

13. The method of scheduling of claim 12, wherein said phone number is selected to allow said recipient to establish communication with an automated phone system.

14. The method of scheduling of claim 13, wherein said automated phone system is configured to allow said recipient to access information regarding said item.

15. The method of scheduling of claim 13, wherein said automated phone system is configured to allow said recipient to provide the response of Step (F).

16. The method of scheduling of claim 13, wherein said automated phone system is configured for: (1) communicating said one or more cost-effective time windows to said recipient; and (2) allowing said recipient to provide said response.

* * * * *